US011315324B2

(12) United States Patent
Ueda et al.

(10) Patent No.: US 11,315,324 B2
(45) Date of Patent: Apr. 26, 2022

(54) VIRTUAL TRY-ON SYSTEM FOR CLOTHING

(71) Applicants: KABUSHIKI KAISHA TOSHIBA, Tokyo (JP); TOSHIBA SOLUTIONS CORPORATION, Kawasaki (JP)

(72) Inventors: Hiroki Ueda, Tokyo (JP); Hisao Yoshioka, Tokyo (JP)

(73) Assignees: KABUSHIKI KAISHA TOSHIBA, Tokyo (JP); TOSHIBA SOLUTIONS CORPORATION, Kawasaki (JP)

( * ) Notice: Subject to any disclaimer, the term of this patent is extended or adjusted under 35 U.S.C. 154(b) by 1325 days.

(21) Appl. No.: 14/980,087

(22) Filed: Dec. 28, 2015

(65) Prior Publication Data

US 2016/0189431 A1 Jun. 30, 2016

(30) Foreign Application Priority Data

Dec. 25, 2014 (JP) .............................. JP2014-263309

(51) Int. Cl.
*G06Q 30/00* (2012.01)
*G06T 19/00* (2011.01)
*G06Q 30/06* (2012.01)

(52) U.S. Cl.
CPC ....... *G06T 19/006* (2013.01); *G06Q 30/0631* (2013.01); *G06Q 30/0633* (2013.01); *G06Q 30/0643* (2013.01); *G06T 2210/16* (2013.01)

(58) Field of Classification Search
CPC .............. G06T 19/006; G06T 2210/16; G06Q 30/0633; G06Q 30/0631; G06Q 30/0643
(Continued)

(56) References Cited

U.S. PATENT DOCUMENTS

| 2011/0298897 | A1* | 12/2011 | Sareen | G06N 3/006 |
| | | | | 348/47 |
| 2013/0046637 | A1* | 2/2013 | Slutsky | G06Q 30/0269 |
| | | | | 705/14.66 |
| 2014/0035913 | A1* | 2/2014 | Higgins | G06Q 30/00 |
| | | | | 345/420 |

FOREIGN PATENT DOCUMENTS

| JP | 2004-086662 | 3/2004 |
| JP | 2006-135876 | 5/2006 |

(Continued)

OTHER PUBLICATIONS

Jiyeon Kim, Sandra Forsythe, Adoption of Virtual Try-on technology for online apparel shopping, Journal of Interactive Marketing, vol. 22, Issue 2, 2008, pp. 45-59, ISSN 1094-9968, https://doi.org/10.1002/dir.20113. (https://www.sciencedirect.com/science/article/pii/S1094996808700100) (Year: 2008).*

*Primary Examiner* — Anand Loharikar
(74) *Attorney, Agent, or Firm* — Amin, Turocy & Watson, LLP

(57) ABSTRACT

According to an embodiment, an acquisition unit of a first terminal acquires a try-on subject image. A first calculator calculates composite position information indicating a composite position of a clothing image in the try-on subject image. A first transmission unit transmits, to a server device, user information including the try-on subject image and the composite position information. A second reception unit of the server device receives the user information from the first terminal. Upon receipt of second information including a signal of request for execution of virtual try-on from a portable second terminal, a second transmission unit transmits third information including the user information and the clothing image to the second terminal. A third transmission unit of the second terminal transmits the second information to the server device. A third reception unit receives the third (Continued)

information from the server device. A third storage unit stores the received third information.

16 Claims, 15 Drawing Sheets

(58) Field of Classification Search
USPC .............................................. 705/26.1–27.2
See application file for complete search history.

(56) References Cited

FOREIGN PATENT DOCUMENTS

| | | |
|---|---|---|
| JP | 2010-192799 | 9/2010 |
| JP | 2014-165613 | 9/2014 |

* cited by examiner

FIG.7

| CLOTH-ING ID | PROD-UCT NAME | ATTRIBUTE INFORMA-TION (MANUFAC-TURER'S NAME AND PRICE) | SHOOT-ING ANGLE | BODY SHAPE PARAMETERS ||| MODEL ID | CLOTHING IMAGE |
|---|---|---|---|---|---|---|---|---|
| | | | | GAR-MENT LENGTH | SHOUL-DER WIDTH | GAR-MENT WIDTH | SLEEVE LENGTH | | |
| C001 | SWEAT PARKA | APPAREL COMPANY A | 0° | | | | | | /home/clothes/C001/0/picture.zip |
| | | | 20° | | | | | | /home/clothes/C001/20/picture.zip |
| | | | 60° | | | | | | /home/clothes/C001/60/picture.zip |
| | | | 180° | 65 cm | 44.5 cm | 51 cm | 62.5 cm | | /home/clothes/C001/180/picture.zip |
| | | | ... | | | | | | /home/clothes/C001/·· /picture.zip |
| | | | ... | | | | | | /home/clothes/C001/·· /picture.zip |
| | | | ... | | | | | | /home/clothes/C001/·· /picture.zip |
| C002 | SWEATER | APPAREL COMPANY B | 0° | 63 cm | 44 cm | 51 cm | 63 cm | | /home/clothes/C002/picture.zip |
| | | | 20° | | | | | | ... |
| | | | ... | | | | | | ... |
| ... | ... | ... | | ... | ... | ... | ... | ... | ... |

FIG.9A

| USER ID | PASSWORD | SHOOTING DATE INFORMATION | BODY SHAPE PARAMETERS | | | |
|---|---|---|---|---|---|---|
| | | | GARMENT LENGTH | SHOULDER WIDTH | GARMENT WIDTH | SLEEVE LENGTH |
| U001 | ebc4c06b266b | 2010/10/10 | 64 cm | 45 cm | 52 cm | 64 cm |
| | | 2014/4/5 | 66 cm | 50 cm | 55 cm | 66 cm |
| U002 | 2f3bc18c0d3e | 2012/8/3 | 63 cm | 44 cm | 51 cm | 63 cm |

FIG.9B

| USER ID | SHOOTING ANGLE | TRY-ON SUBJECT IMAGE | COMPOSITE POSITION INFORMATION | SHOOTING DATE INFORMATION | PUBLIC VIEW |
|---|---|---|---|---|---|
| U001 | 0° | /home/user/U001/0/picture.zip | /home/user/U001/picture.zip | 2010/10/10 | × |
| | 20° | /home/user/U001/20/picture.zip | /home/user/U001/picture.zip | | |
| | 60° | /home/user/U001/60/picture.zip | /home/user/U001/picture.zip | | |
| | 180° | /home/user/U001/180/picture.zip | /home/user/U001/picture.zip | | |
| | ⋮ | /home/user/U001/··/picture.zip | /home/user/U001/picture.zip | | |
| | ⋮ | /home/user/U001/··/picture.zip | /home/user/U001/picture.zip | | |
| | ⋮ | /home/user/U001/··/picture.zip | /home/user/U001/picture.zip | | |
| | 0° | | ⋮ | ⋮ | 2014/4/5 |
| | 20° | | | | |
| | 60° | | | | |
| | 180° | | | | |
| | ⋮ | ⋮ | ⋮ | | |
| | ⋮ | ⋮ | ⋮ | | |
| U002 | 0° | /home/user/U002/picture.zip | /home/user/U002/picture.zip | 2012/8/3 | × |
| | 20° | ⋮ | ⋮ | | |
| | 60° | ⋮ | ⋮ | | |
| | 180° | ⋮ | ⋮ | | |
| | ⋮ | ⋮ | ⋮ | | |
| | ⋮ | ⋮ | ⋮ | | |
| U003 | 0° | /home/user/U003/picture.zip | ⋮ | 2009/6/8 | ○ |
| | 20° | ⋮ | | | |
| | 60° | ⋮ | | | |
| | 180° | ⋮ | | | |
| | ⋮ | ⋮ | ⋮ | | |
| | ⋮ | ⋮ | ⋮ | | |

FIG.9C

| USER ID | RELATED USER ID |
|---|---|
| U001 | U002 |
| U002 | U003 |
| | U004 |
| | U005 |

FIG.10A

| TRY-ON HISTORY ID | DATE AND TIME | CLOTHING ID | USER ID | TRY-ON TIME |
|---|---|---|---|---|
| V00001 | 2014/11/21 4:28 PM | C001 | U001 | 37 SECONDS |
| V00002 | 2014/11/21 4:30 PM | C002 | U001 | 125 SECONDS |
| V00003 | 2014/11/21 4:35 PM | C001 | U002 | 67 SECONDS |

FIG.10B

| PURCHASE ID | DATE AND TIME | CLOTHING ID | NUMBER | USER ID |
|---|---|---|---|---|
| A00100 | 2014/11/21 5:10 PM | C001 | 1 | U001 |
| A00200 | 2014/11/21 5:34 PM | C002 | 1 | U002 |

…

VIRTUAL TRY-ON SYSTEM FOR CLOTHING

CROSS-REFERENCE TO RELATED APPLICATIONS

This application is based upon and claims the benefit of priority from Japanese Patent Application No. 2014-263309, filed on Dec. 25, 2014, the entire contents of which are incorporated herein by reference.

FIELD

An embodiment described herein relates generally to a virtual try-on system, a virtual try-on terminal, a virtual try-on method, and a computer program product.

BACKGROUND

There are disclosed techniques for displaying a virtual image of clothing to be tried on being worn. For example, there are disclosed techniques for displaying a composite image of a user trying on clothing.

BRIEF DESCRIPTION OF THE DRAWINGS

FIG. 7 is a diagram illustrating an example of a data structure of first information;
FIGS. 9A and 9B are diagrams illustrating examples of data structures of user information and fourth information;
FIG. 9C is a diagram illustrating an example of a data structure of fourth information;
FIG. 10A is a diagram illustrating an example of data structure of try-on information;
FIG. 10B is a diagram illustrating an example of data structure of purchase information.

DETAILED DESCRIPTION

According to an embodiment, a virtual try-on system includes a first terminal installed at a predetermined place; server device connected to the first terminal; and a second terminal that is portable and connected to the server device. The first terminal includes an acquisition unit configured to acquire a try-on subject image of a try-on subject; a first calculator configured to calculate composite position information indicative of a composite position of a clothing image in the try-on subject image; and a first transmission unit configured to transmit, to the server device, user information including the try-on subject image and the composite position information. The server device includes a second storage unit configured to store in advance first information including a clothing image; a second reception unit configured to receive the user information from the first terminal; and a second transmission unit configured to, upon receipt of second information including a signal of request for execution of virtual try-on from the second terminal, transmit third information including the user information and the clothing image to the second terminal having transmitted the second information. The second terminal includes a third transmission unit configured to transmit the second information to the server device; a third reception unit configured to receive the third information from the server device; and a third storage unit configured to store the received third information.

An embodiment will be described below in detail with reference to the accompanying drawings.

Figure 1:
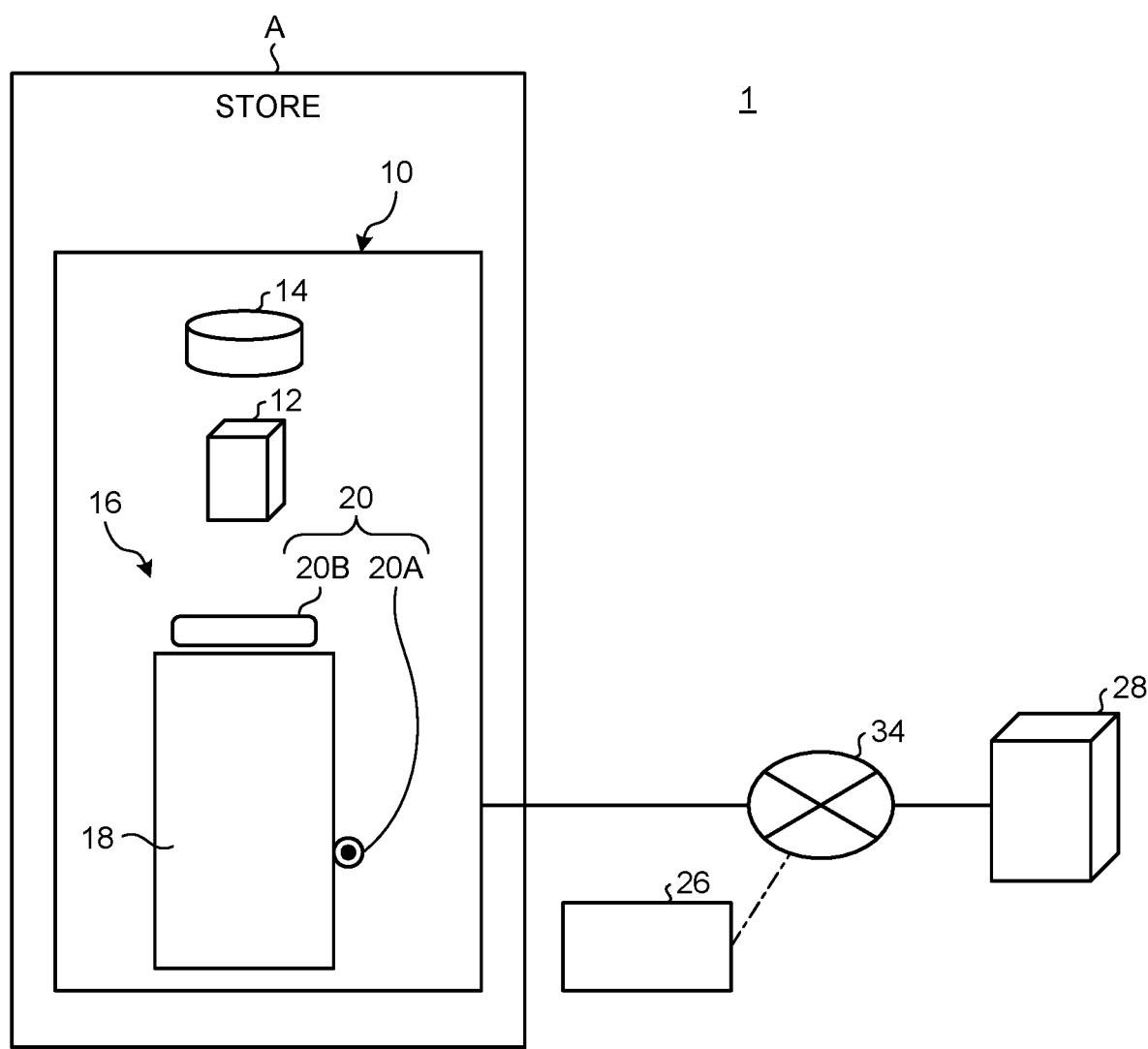
FIG. 1 is a schematic view of a virtual try-on system according to an embodiment.

FIG. 1 is a schematic view of a virtual try-on system 1 according to the embodiment.

The virtual try-on system 1 includes a first terminal 10, a second terminal 26 (virtual try-on terminal), and a server device 28. The first terminal 10, the server device 28, and the second terminal 26 are connected to each other via a communication line 34. The communication line 34 is a known network. The first terminal 10 and the server device 28 are connected to the communication line 34 in a wired or wireless manner. Meanwhile, the second terminal 26 is preferably connected to the communication line 34 in a wireless manner. The second terminal 26 is a portable terminal.

The first terminal 10 is installed at a predetermined place. The first terminal 10 is used in a state of being fixed to the predetermined place. In this embodiment, the predetermined place is assumed as a store A where products are sold and services are offered to customers.

The predetermined place is not limited to a store. For example, the predetermined place may be a show window, a lounge at an airport, or the like.

In this embodiment, the virtual try-on system 1 includes one first terminal 10, one server device 28, and one second terminal 26 as an example. However, the number of each component of the virtual try-on system 1 is not limited to one but the virtual try-on system 1 may include one or more first terminals 10, one or more server devices 28, and one or more second terminals 26.

The first terminal 10 is a device that acquires a try-on subject image of a try-on subject. The first terminal 10 may also display a composite image of a try-on subject image and a clothing image.

The first terminal 10 includes a controller 12, a first storage unit 14, and a main unit 16. The controller 12 controls the components provided in the first terminal 10. The first storage unit 14 is a known hard disk device that stores various kinds of data. The main unit 16 includes a first display unit 18 and a shooting unit 20.

The shooting unit 20 includes a first shooting unit 20A and a second shooting unit 20B.

The first shooting unit 20A shoots a try-on subject and obtains a try-on subject image of the try-on subject.

The try-on subject is a target trying on clothing. The try-on subject may be a living object or a non-living object as far as it is a target trying on clothing. The living object is not limited to a person but may be an animal such as a dog or a cat. The non-living object may be, but not limited to, a mannequin of human or animal body or another object. The try-on subject may be a living object or non-living object wearing clothing. In this embodiment, the try-on subject is a person.

In this embodiment, the try-on subject and persons other than the try-on subject will also be collectively referred to as users. In addition, in this embodiment, identification information for identifying the try-on subject will be referred to as try-on subject identification information (also referred to as try-on subject ID). To describe collectively the identification information of the users including the try-on subject, the information will also be appropriately referred to as user identification information (or the user IDs).

The clothing means items the try-on subject can wear. The clothing includes outer clothes, skirts, trousers, shoes, headwear, for example. However, the clothing is not limited to outer clothes, skirts, trousers, shoes, headwear, and others.

In this embodiment, the try-on subject image is a bitmap image. The try-on subject image is an image in which pixel value indicative of the colors and brightness of the try-on subject is specified for each pixel. The first shooting unit 20A is a known shooting device that is capable of acquiring the try-on subject image.

The second shooting unit 20B acquires a depth map by shooting.

The depth map may also be referred to as distance image. The depth map is an image that defines, for each pixel, the distance from the second shooting unit 20B. In this embodiment, the depth map may be created by a known method such as stereo matching from the try-on subject image or may be acquired by the second shooting unit 20B shooting the try-on subject under the same shooting conditions as those for the try-on subject image. The second shooting unit 20B is a known shooting device that is capable of acquiring the depth map.

In this embodiment, the first shooting unit 20A and the second shooting unit 20B shoot the try-on subject at the same timing. The first shooting unit 20A and the second shooting unit 20B are controlled by the controller 12 to perform sequential shooting at the same timing in synchronization with each other. The shooting unit 20 outputs sequentially the try-on subject images of the try-on subject acquired by shooting and the depth maps to the controller 12.

In this embodiment, the first shooting unit 20A and the second shooting unit 20B shoot the try-on subject at a plurality of shooting angles. Accordingly, the first shooting unit 20A acquires the try-on subject images corresponding to the plurality of shooting angles, and the second shooting unit 20B acquires the depth maps corresponding to the plurality of shooting angles.

The shooting angles are different from one another. For example, the shooting angles are predetermined angles when the try-on subject is rotated by 360° with the body thereof as a rotation axis. Specifically, the shooting angles may cover 0° to 360° at predetermined angular intervals (for example, 5°). The shooting angle of 0° is a shooting angle at which the try-on subject faces the first display unit 18, for example. The shooting angle of 180° is a shooting angle at which his/her back of the try-on subject faces the first display unit 18, for example.

Specifically, the first shooting unit 20A and the second shooting unit 20B are arranged at positions where the try-on subject facing the display surface of the first display unit 18 can be shot from the plurality of different shooting directions. The shooting unit 20 can acquire the try-on subject images and the depth maps corresponding to the plurality of shooting angles by acquiring the images shot by the first shooting unit 20A and the second shooting unit 20B.

When the try-on subject faces the display surface of the first display unit 18, the controller 12 performs a control to output a message prompting the try-on subject to rotate clockwise or counterclockwise. For example, the controller 12 may display the message on the first display unit 18. Alternatively, for example, the main unit 16 may include a speaker and the controller 12 may output the message from the speaker.

The first shooting unit 20A and the second shooting unit 20B are arranged at positions where the try-on subject can be shot from the front when the try-on subject faces the first display unit 18. As the try-on subject rotates, the first shooting unit 20A and the second shooting unit 20B shot the try-on subject continuously. Accordingly, the shooting unit 20 can use the one first shooting unit 20A and the one second shooting unit 20B to acquire the try-on subject images and depth maps corresponding to the plurality of shooting angles.

The first display unit 18 is a device that displays various images. For example, the first display unit 18 is a known display device such as a liquid crystal display device. In this embodiment, the first display unit 18 displays the try-on subject image shot by the first shooting unit 20A. This allows the try-on subject facing the first display unit 18 to look in the first display unit 18 as if looking in a mirror. The first display unit 18 may also display a composite image described later generated by the controller 12.

The first display unit 18 is incorporated into one plane of a rectangular housing, for example. In this embodiment, the first display unit 18 is formed in a size equal to or larger than the life-size of a person. However, the size of the first display unit 18 is not limited to this.

Figure 2:
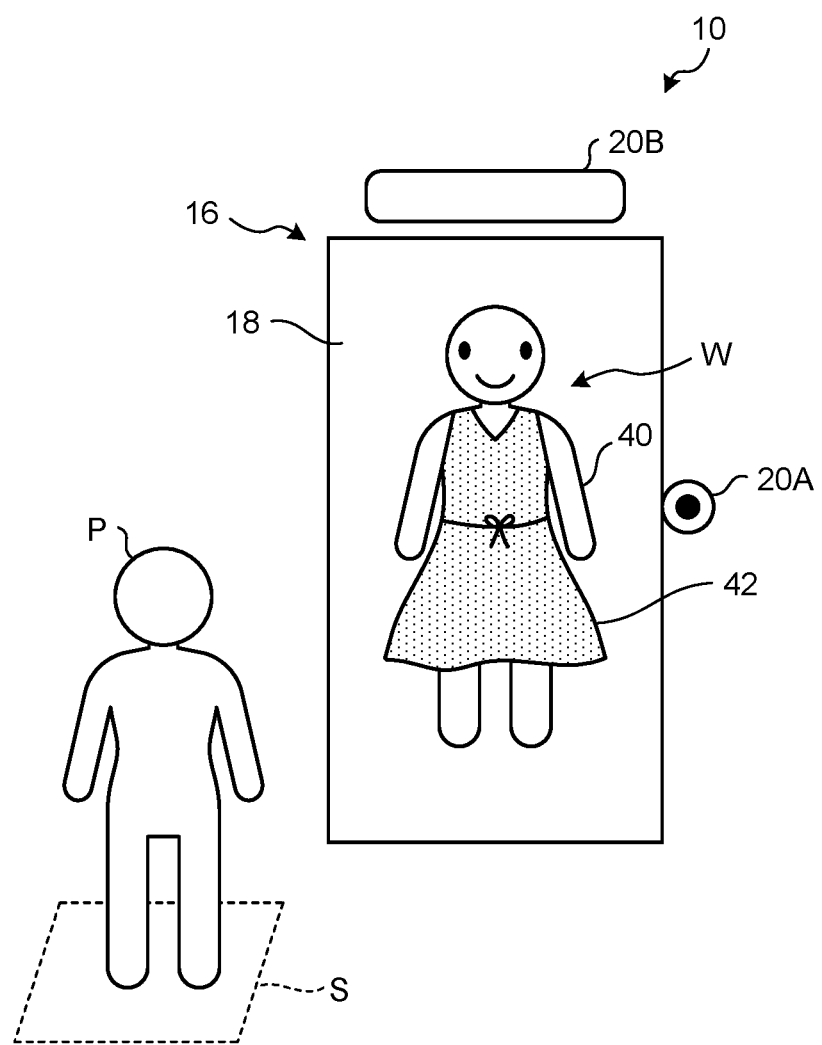
FIG. 2 is a schematic view illustrating the positional relationship between a main unit and a try-on subject.

FIG. 2 is a schematic view illustrating the positional relationship between the main unit 16 and a try-on subject P according to the embodiment.

The controller 12 (not illustrated in FIG. 2) displays, on the first display unit 18, a try-on subject image 40 of the try-on subject P, a composite image W of the try-on subject P trying on various types of clothing, and the like. FIG. 2 illustrates the composite image W of the try-on subject image 40 and a clothing image 42 as an example. The try-on subject P such as a person visually checks the composite image W presented on the first display unit 18 at a position facing the display surface of the first display unit 18, for example. When being positioned in a predetermined area S, the try-on subject faces the display surface of the first display unit 18, for example. The area S defines the position where the try-on subject faces the display surface of the first display unit 18. The second shooting unit 20B and the first shooting unit 20A are adjusted in advance in shooting position and shooting direction such that the try-on subject P facing the display surface of the first display unit 18 can be shot.

Figure 3:
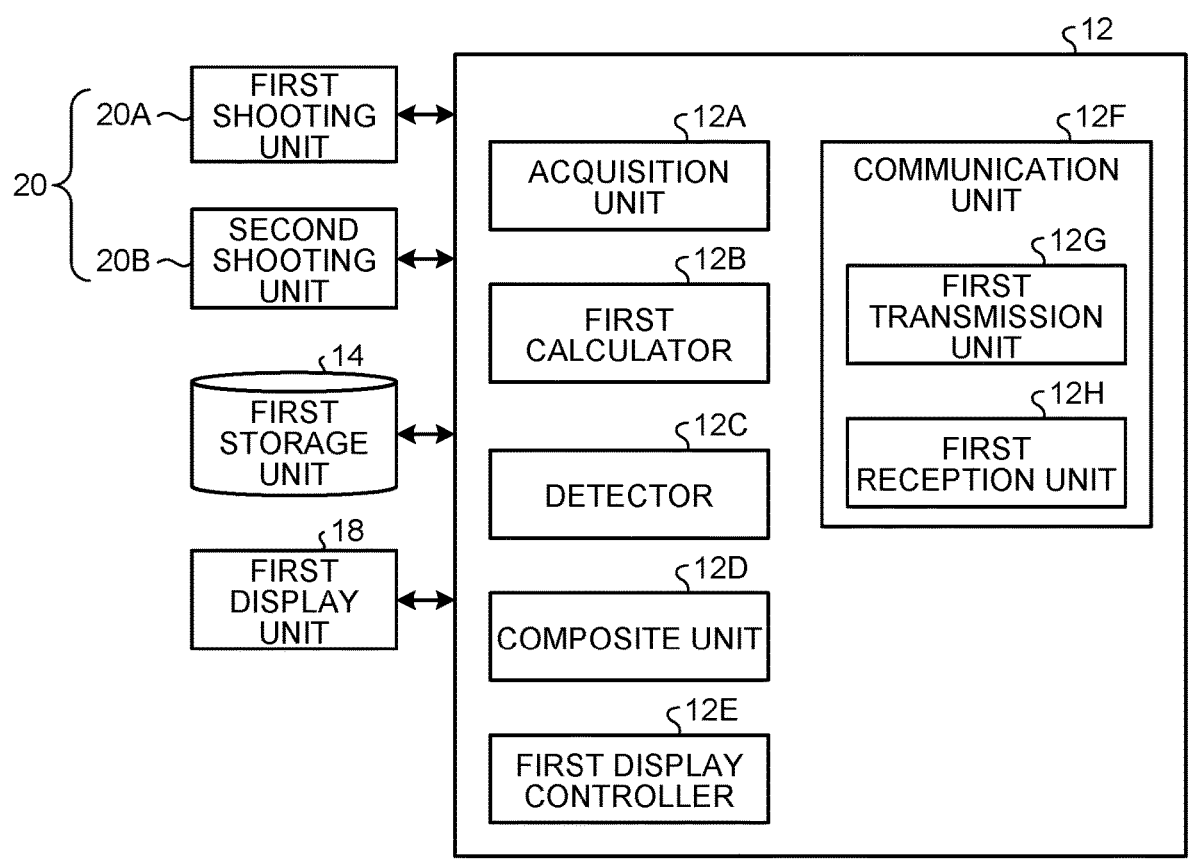
FIG. 3 is a functional block diagram of a first terminal.

FIG. 3 is a functional block diagram of the first terminal 10.

The first terminal 10 includes the controller 12, the shooting unit 20, the first storage unit 14, and the first display unit 18. The shooting unit 20, the first storage unit 14, and the first display unit 18 are connected to the controller 12 so as to be capable of exchanging signals with the controller 12.

The first storage unit 14 stores various kinds of data. The main unit 16 is assumed to be placed in a show window or the like, for example. The show window means glass display shelves at a store where clothing as commodity products is displayed, for example. The show window will also be called display window, shop window, store window, and the like.

In this case, the first storage unit 14 may store in advance the clothing image of the clothing displayed in the show window.

The controller 12 includes an acquisition unit 12A, a first calculator 12B, a detector 12C, a composite unit 12D, a first display controller 12E, and a communication unit 12F.

Some or all of the acquisition unit 12A, the first calculator 12B, the detector 12C, the composite unit 12D, the first display controller 12E, and the communication unit 12F may be implemented by causing a processing device such as a central processing unit (CPU) to execute programs, that is, by software, or may be implemented by hardware such as an integrated circuit (IC), or may be implemented by software and hardware in combination.

The acquisition unit 12A acquires the try-on subject image of the try-on subject. The acquisition unit 12A acquires the try-on subject image from the first shooting unit 20A. When the first shooting unit 20A shoots the try-on subject images corresponding to the shooting angles, the acquisition unit 12A acquires the try-on subject images corresponding to the shooting angles.

In this embodiment, the acquisition unit 12A may further acquire a body shape parameter for the try-on subject.

The body shape parameter is information indicative of the body shape of the user. The body shape parameter includes one or more parameters. The parameters are measured values of one or more parts of the human body. The measured values are not limited to actually measured values but include estimated values of measured values and values equivalent to measured values.

Specifically, the body shape parameter includes at least one of parameters for chest, waist, hip, body height, and shoulder width. However, the parameters included in the body shape parameter are not limited to them. For example, the body shape parameter may include parameters for sleeve length, leg length, and the like.

The body shape parameter may be information indicative of the body shape of the try-on subject or may be information indicative of the size of clothing fitted to the body shape of the try-on subject when the try-on subject is assumed to wear the clothing. In this case, the body shape parameter may include parameters for garment length, shoulder width, garment width, sleeve length, and the like, for example. In this embodiment, the body shape parameter includes parameters for garment length, shoulder width, garment width, and sleeve length. However, the body shape parameters are not limited to them.

For example, the acquisition unit 12A acquires the body shape parameters by calculating the body shape parameters for the try-on subject from the depth map acquired from the second shooting unit 20B.

More specifically, the acquisition unit 12A first extracts a person area from the depth map acquired from the second shooting unit 20B to acquire the depth map for the try-on subject.

For example, the acquisition unit 12A extracts the person area by setting a threshold value for a distance in a depth direction at three-dimensional positions of pixels constituting the depth map. For example, in the camera coordinate system of the second shooting unit 20B, with the position of the second shooting unit 20B as an original point, a Z-axis positive direction is aligned with an optical axis of a camera extended in a direction from the original point of the second shooting unit 20B toward the subject (try-on subject). In this case, among the pixels constituting the depth map, pixels whose position coordinate in the depth direction (Z-axis direction) is equal to or larger than a predetermined threshold (for example, a value indicative of 1 m) are excluded. Accordingly, the acquisition unit 12A acquires, from the second shooting unit 20B, the depth map composed of the pixels in the person area existing within the range of the threshold. That is, the acquisition unit 12A acquires the depth map for the try-on subject.

Next, the acquisition unit 12A calculates the body shape parameters for the try-on subject from the depth map for the try-on subject acquired from the second shooting unit 20B.

For example, the acquisition unit 12A applies three-dimensional human body model data (three-dimensional polygon model) to the depth map for the try-on subject. The acquisition unit 12A then uses the depth map and the three-dimensional model data applied to the try-on subject to calculate the values for the parameters (for example, garment length, shoulder width, garment width, sleeve length, and the like) included in the body parameters. In this manner, the acquisition unit 12A acquires the body parameters for the try-on subject.

The first calculator 12B calculates composite position information indicative of the composite position of the clothing image in the try-on subject image acquired by the acquisition unit 12A. The composite position is used for position adjustment at the time of composition of the clothing image with the area indicative of the try-on subject in the try-on subject image (hereinafter, referred to as try-on subject area).

The composite position information may be information indicative of a specific body part (for example, shoulders) of the try-on subject in the try-on subject image, or may be information indicative of a composite target area of the clothing image in the try-on subject image, for example. In this embodiment, the composite position information indicates the composite target area of the clothing image in the try-on subject image.

Figure 4:
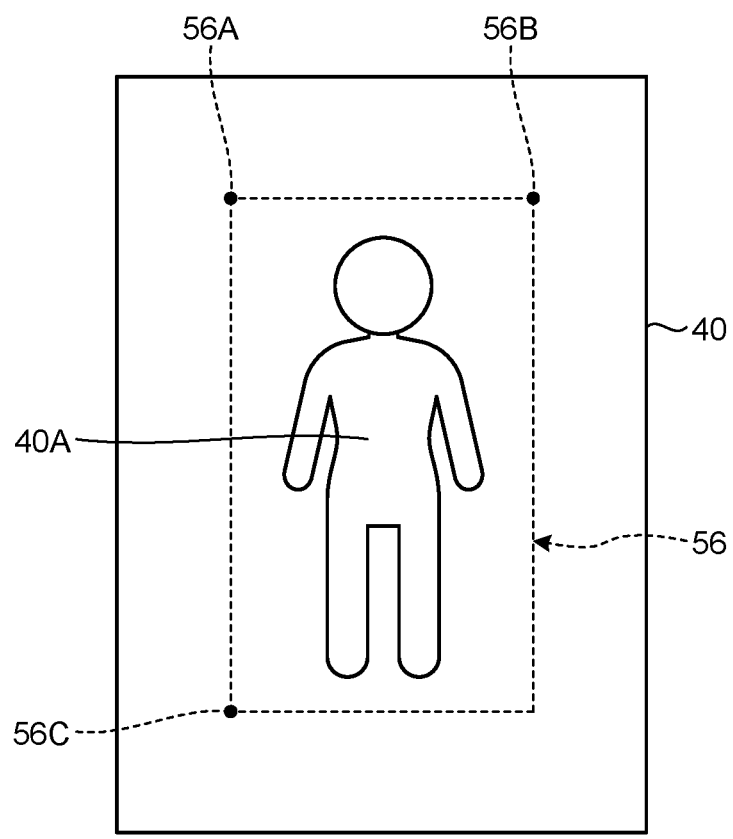
FIG. 4 is an illustrative view of a composite target area.

FIG. 4 is an illustrative view of the composite target area. For example, the acquisition unit 12A acquires the try-on subject image 40 illustrated in FIG. 4. The shooting unit 20 shots the try-on subject P positioned in the area S at a predetermined fixed shooting magnification ratio.

In this case, the first calculator 12B calculates, as composite position information, a rectangular composite target area 56, which is included in the try-on subject image 40 and surrounds a try-on subject area 40A indicative of the try-on subject P. In this case, the composite position information indicative of the composite target area 56 includes the position coordinates at one apex (for example, an apex 56A) of the rectangular composite target area 56 in the try-on subject image 40 and the distances from the apex 56A to two apexes (an apex 56B and an apex 56C) continuous from the apex 56A. The composite position information is not limited to the method specified by the foregoing information.

Returning to FIG. 3, when the acquisition unit 12A acquires the try-on subject images corresponding to the plurality of shooting angles, the first calculator 12B calculates the composite position information for each of the try-on subject images corresponding to the plurality of shooting angles.

The communication unit 12F is a known communication interface for communications with the server device 28 via the communication line 34. The communication unit 12F may also be communicable with the second terminal 26.

The communication unit 12F includes a first transmission unit 12G and a first reception unit 12H.

The first transmission unit 12G transmits user information to the server device 28. In this embodiment, the first transmission unit 12G transmits a user ID and user information to the server device 28. The user ID is information for uniquely identifying the user. The user information includes at least try-on subject images and composite position information. The try-on subject images included in the user information are the try-on subject images acquired by the acquisition unit 12A. The composite position information included in the user information is composite position information calculated by the first calculator 12B, which corresponds to the individual try-on subject images.

When the first calculator 12B calculates the body shape parameters for the try-on subject, the first transmission unit 12G transmits the user information further including the body shape parameters to the server device 28. That is, in this case, the user information includes at least the try-on subject images, the composite position information corresponding to the try-on subject images, and the body shape parameters for the try-on subject in the try-on subject images.

When the acquisition unit 12A acquires the try-on subject images respectively corresponding to the plurality of shooting angles, the first transmission unit 12G may transmit the user information including at least the try-on subject images respectively corresponding to the plurality of shooting angles and pieces of the composite position information respectively corresponding to the plurality of try-on subject images to the server device 28.

The user information may further include shooting date information of the try-on subject images. The shooting date information is information indicative of the shooting dates of the try-on subject images. The shooting date information is not limited to the "date" but may indicate any timing for shooting the try-on subject images. For example, the shooting date information includes the years, months, dates, hours, minutes, seconds, and the like when the try-on subject images are shot.

The user information may further include other information. For example, the user information may further include a depth map used for calculation of the body shape parameters. The user specified by the user information is the try-on subject in the try-on subject images included in the user information.

In this embodiment, as an example, a case will be described in which the first transmission unit 12G transmits, to the server device 28, the user information including the try-on subject images respectively corresponding to the plurality of shooting angles, pieces of the composite positon information respectively corresponding to the plurality of try-on subject images, pieces of the shooting date information of the plurality of try-on subject images, the body shape parameters corresponding to the try-on subject in the try-on subject images, the depth map used for calculation of the body shape parameters, the user identification information, and a password.

The password is a password to be input by the try-on subject by use of the second terminal 26 to do virtual try-on. For example, at the time of acquisition of the try-on subject images, the controller 12 of the first terminal 10 displays, on the first display unit 18, a message prompting the user to input of the password. Then, when the user operates the input unit to input the password, the controller 12 acquires the password.

The user information needs to include at least the try-on subject images and the composite position information but may not include at least one of the shooting date information, the body shape parameters, the depth map, and the password.

The first transmission unit 12G also transmits one piece of user information for one try-on subject to the server device 28. That is, the first transmission unit 12G transmits, to the server device 28, the user ID for identifying one try-on subject and the user information on the user (try-on subject) identified by the user ID in a pair.

The first reception unit 12H receives various kinds of data and signals from the server device 28 and the second terminal 26 via the communication line 34. For example, the first reception unit 12H receives, from the server device 28, a clothing image to be composited with the try-on subject image at the first terminal 10, and stores the same in the first storage unit 14.

The detector 12C detects that the try-on subject is positioned in the predetermined area S in the real space. The detector 12C accepts a detection signal from a sensor detecting that the user is positioned in the area S (see FIG. 2) where the try-on subject faces the display surface of the first display unit 18, for example. Then, the detector 12C uses the detection signal to detect that the try-on subject is positioned in the area S.

When the detector 12C detects that the try-on subject is positioned in the area S, the composite unit 12D generates the composite image W by compositing the try-on subject image acquired by the acquisition unit 12A from the first shooting unit 20A with the clothing image stored in advance in the first storage unit 14.

The clothing image stored in advance in the first storage unit 14 is a clothing image of clothing displayed in the show window where the main unit 16 is installed as described above, for example. The composite unit 12D generates the composite image by superimposing the clothing image on the try-on subject image at the position indicated by the composite position information. The method for generating the composite image by the composite unit 12D is the same as the method for generating the composite image at the second terminal 26 (described later in detail).

The first display controller 12E performs a control to display various images on the first display unit 18. For example, when the acquisition unit 12A acquires a try-on subject image, the first display controller 12E displays the acquired try-on subject image on the first display unit 18. When the composite unit 12D generates a composite image, the first display controller 12E performs a control to display the composite image on the first display unit 18.

Figure 5:
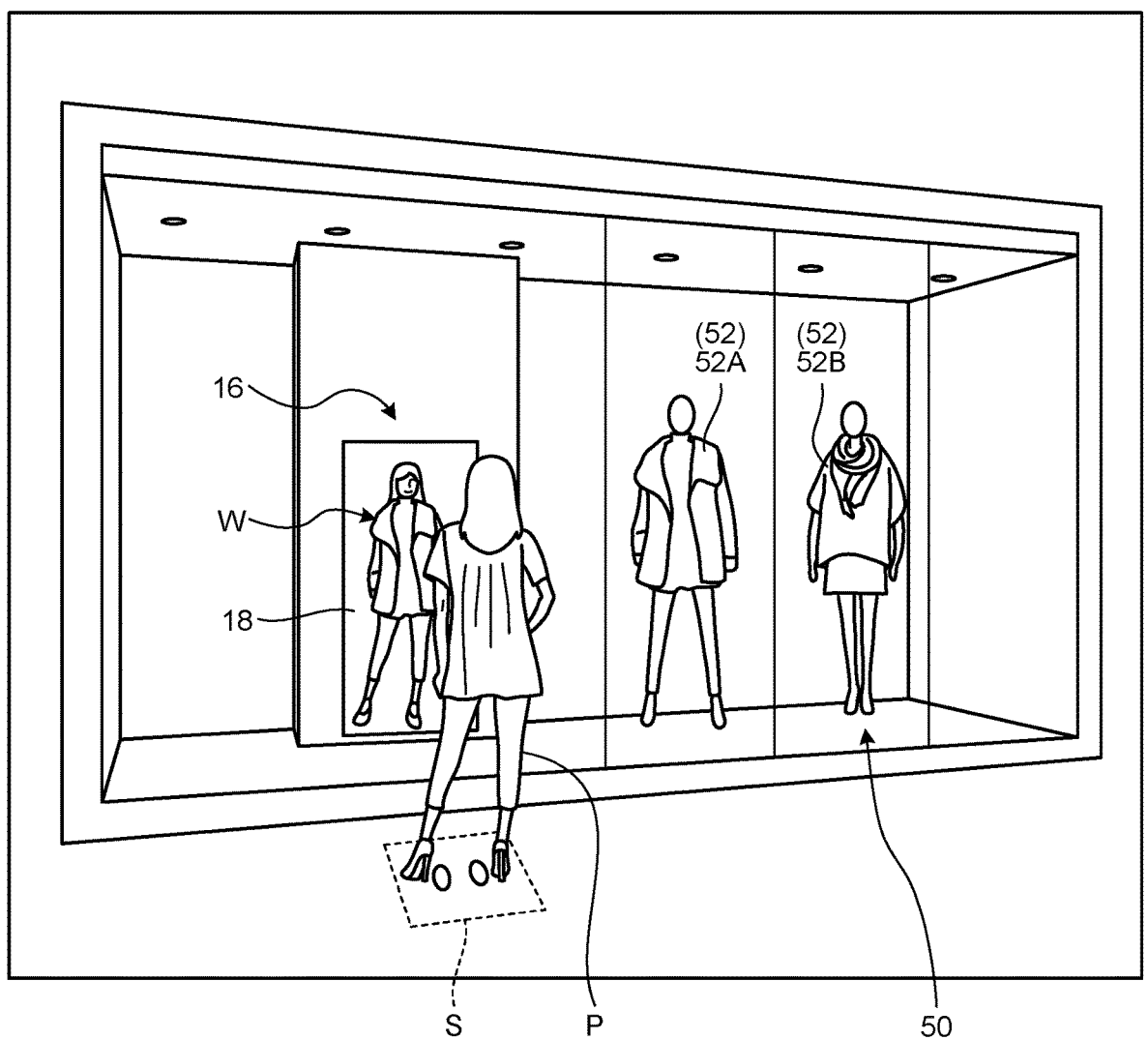
FIG. 5 is a schematic view of a composite image.

FIG. 5 is a schematic view of the composite image W displayed on the first display unit 18. As illustrated in FIG. 5, the main unit 16 is installed in the show window 50. The try-on subject P is positioned in the area S facing the first display unit 18 in front of the show window 50. Accordingly, the detector 12C detects the try-on subject P. Then, the composite image W in which the clothing image of clothing 52 displayed in the show window 50 (for example, clothing 52A or 52B) is superimposed on the try-on subject image of the try-on subject P is displayed on the first display unit 18.

Accordingly, the user (try-on subject) can check the composite image W simply by standing in front of the first display unit 18 without having to perform any other operation.

When the user makes a predetermined gesture, the clothing image to be composited may be changed. In this case, the controller 12 stores in advance, in the first storage unit 14, information indicative of a gesture (for example, raising the right hand or the left hand, or the like) and information indicative of the process to be performed by the controller 12. The information indicative of the process to be performed by the controller 12 may include changing to the clothing image of other clothing 52 arranged in the show window 50, terminating display of the composite image, or the like, for example. The controller 12 may analyze the try-on subject image shot by the shooting unit 20 to recognize the user's gesture. The controller 12 then performs the process corresponding to the information indicative of the recognized gesture.

Next, the server device 28 will be described.

The server device 28 stores first information (described later in detail) in advance. Upon receipt of a signal of request for execution of virtual try-on from the second terminal 26, the server device 28 transmits various kinds of information necessary for virtual try-on to the second terminal 26.

Figure 6:
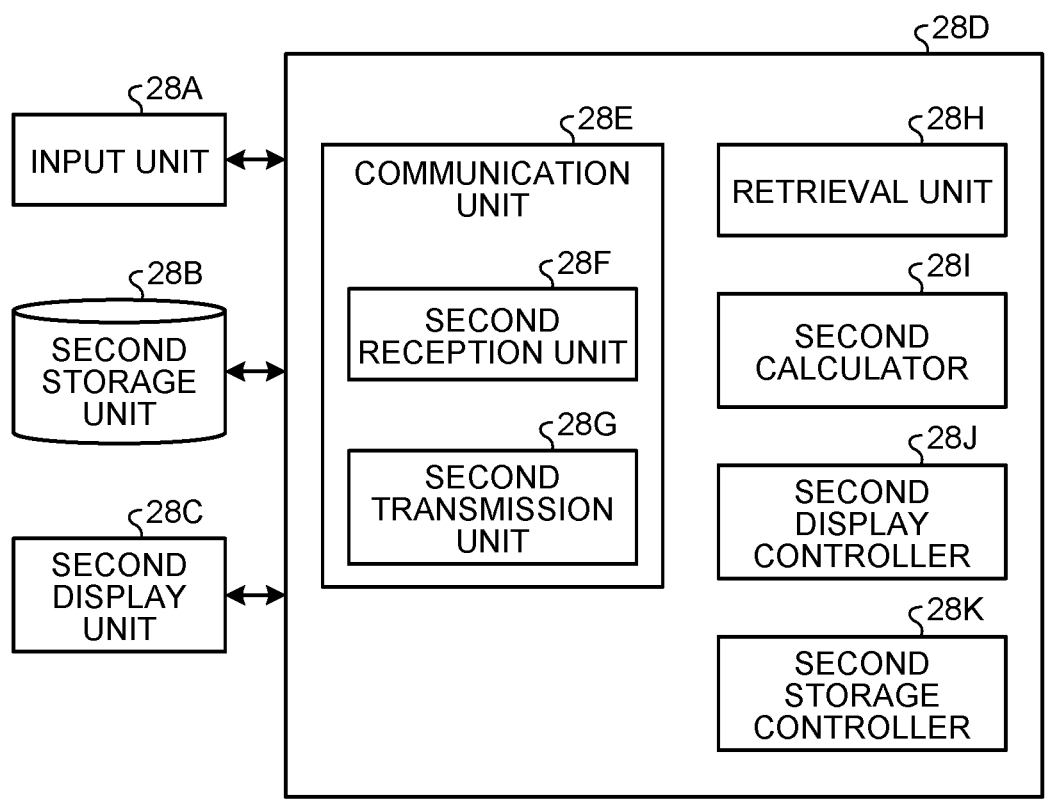
FIG. 6 is a functional block diagram of a server device.

FIG. 6 is a functional block diagram of the server device 28.

The server device 28 includes an input unit 28A, a second storage unit 28B, a second display unit 28C, and a controller 28D. The input unit 28A, the second storage unit 28B, and the second display unit 28C are connected to the controller 28D so as to be capable of exchanging signals.

The input unit 28A accepts input from the user. In this embodiment, the input unit 28A of the server device 28 accepts input from the administrator of the server device 28. The input unit 28A is a unit for the user to perform various input operations. The input unit 28A may be one of a mouse, a button, a remote control, a keyboard, a sound recognition device such as a microphone, and image recognition devices, or a combination of some of them, for example.

The second storage unit 28B stores various kinds of data. In this embodiment, the second storage unit 28B stores the first information, the user information, and fourth information.

The first information includes the clothing images of clothing to be tried on.

FIG. 7 is a diagram illustrating an example of a data structure of the first information.

The first information stores identification information of clothing (hereinafter, referred to as clothing ID), attribute information, shooting angles, body shape parameters, model IDs, and clothing images in association with one another.

The clothing ID is identification information for uniquely identifying the clothing. The product name is the name of the clothing identified by the clothing ID. The attribute information indicates the store, the manufacturer, the brand name, the price, and the like of the clothing identified by the corresponding clothing ID. FIG. 7 indicates the brand names as the attribute information as an example.

The shooting angles and the body shape parameter are as described above. The model ID is identification information of a model such as a human body or a human mannequin of the body shape specified by the corresponding body shape parameters. The clothing image is preferably an image obtained by shooting the model identified by the corresponding model ID and wearing the clothing identified by the corresponding clothing ID.

As illustrated in FIG. 7, in the first information, a plurality of shooting angles are associated with one clothing ID. The clothing images are respectively associated with the plurality of shooting angles. That is, the shooting angles in the first information are the shooting angles at which the clothing in the corresponding clothing images is shot. In other words, the clothing images corresponding to the shooting angles are obtained by shooting the model identified by the model ID (the model of the body shape specified by the body shape parameters) wearing the clothing identified by the corresponding clothing ID at the corresponding shooting angles.

In this embodiment, the clothing area included in the clothing image is arranged at a position where the human body wears the clothing. FIG. 8 includes schematic views illustrating the details of the clothing image 42.

Figure 8A:
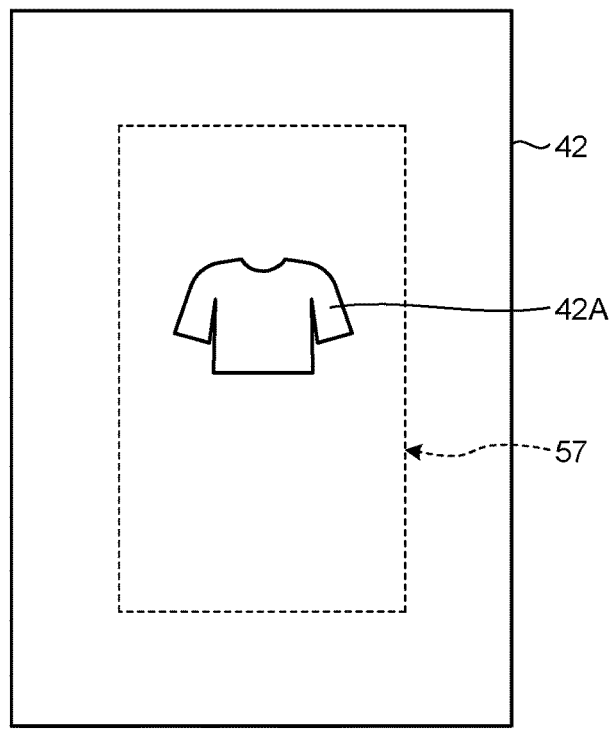
FIGS. 8A and 8B are schematic views illustrating details of clothing images.

As illustrated in FIG. 8A, when the clothing in the clothing area 42A is a shirt, a clothing area 42A indicative of the clothing in the clothing image 42 is arranged at a position corresponding to the upper part of the human body in a rectangular virtual human body area 57 surrounding the human body. In addition, the clothing image 42 has area information indicative of the rectangular virtual human body area 57 surrounding the human body.

Figure 8B:
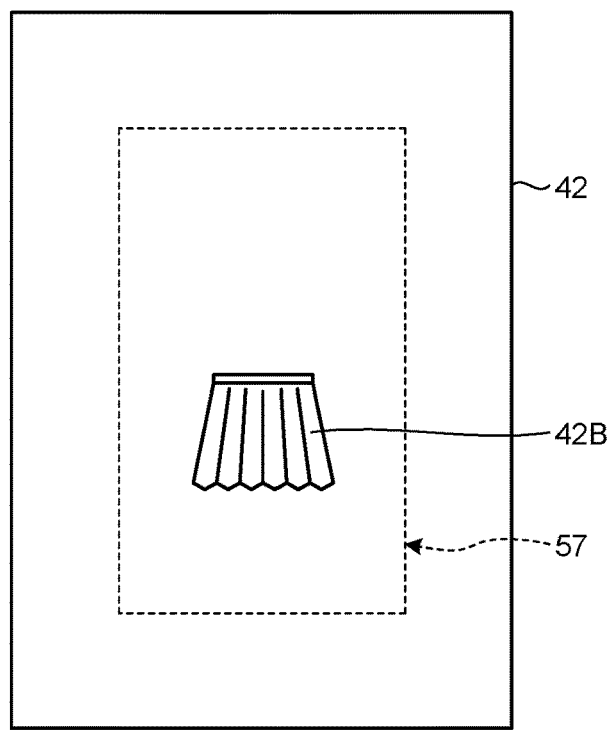

As illustrated in FIG. 8B, when the clothing in the clothing area 42B is a skirt, a clothing area 42B in the clothing image 42 is arranged at a position corresponding to the lower part of the human body in the rectangular virtual human body area 57 surrounding the human body. In addition, the clothing image 42 has area information indicative of the rectangular virtual human body area 57 surrounding the human body.

As described above, in this embodiment, the clothing area of the clothing indicated in the clothing image is positioned in correspondence with the wearing position of the clothing on the human body in the clothing image.

Returning to FIG. 6, the controller 28D of the server device 28 stores the first information in advance in the second storage unit 28B. The controller 28D of the server device 28 may acquire the clothing images and the like via the communication line 34 from another server device distributing the clothing images. The controller 28D may update the first information by storing the acquired clothing images in the second storage unit 28B.

Next, the user information will be described. Upon receipt of the user information and the user ID from the first terminal 10, the server device 28 stores them in association with each other in the second storage unit 28B. As described above, in this embodiment, the user information transmitted by the first terminal 10 to the server device 28 includes the try-on subject images respectively corresponding to the plurality of shooting angles, pieces of the composite position information respectively corresponding to the plurality of try-on subject images, pieces of the shooting date information of the plurality of try-on subject images, the body shape parameters corresponding to the try-on subject seen in the try-on subject images, the depth maps used for calculation of the body shape parameters, and the password. The server device 28 stores the user information in association with the user ID.

The fourth information is information in which first try-on subject identification information of the try-on subject is associated with second try-on subject identification information of other try-on subjects related to the try-on subject.

The other try-on subjects related to the try-on subject may be any try-on subjects other than the try-on subject identified by the first try-on subject identification information. The related other try-on subjects may be relatives (parents, children, grandchildren, grandparents, and the like), friends, or acquaintances of the try-on subject identified by the first try-on subject identification information, and show-business people. The first try-on subject identification information and the second try-on subject identification information may be associated with each other according to a request for association from the try-on subject, for example. More specifically, for example, the try-on subject (the try-on subject identified by the first try-on subject) operates the second terminal 26 to transmit a request for association from the second terminal 26 to the server device 28. The request for association includes the first try-on subject identification information and the second try-on subject identification information. Upon receipt of the request for association, the server device 28 registers the first identification information and the second identification information included in the request for association, in association with each other as the fourth information.

FIGS. 9A and 9B are diagrams illustrating examples of data structures of the user information and the fourth information.

FIGS. 9A and 9B illustrate an example of a data structure of the user information. In the example of FIGS. 9A and 9B, the second storage unit 28B stores in a separate manner the user information corresponding to each of the user IDs into two databases (first DB and second DB).

Specifically, the first DB is a database that stores the user IDs and part of the user information (password, shooting date information, and body shape parameters) in association with each other. The second DB is a database that stores the user IDs and the other part of the user information (shooting angles, try-on subject images, composite position information, shooting date information, and public view) in association with each other. The second storage unit 28B may store the user information corresponding to the user IDs in one integrated form of the first DB and the second DB. There is no limitation on the storage form of the user information.

In the example of FIGS. 9A and 9B, the user information further includes the item "public view." The item "public view" indicates whether the try-on subject image of the try-on subject identified by the corresponding user ID is to be viewable to all users or not. When the item "public view" has the symbol "X," the try-on subject images are not to be on public view. When the item "public view" has the symbol "◯," the try-on subject images are to be on public view.

The item "public view" may be set by the administrator of the server device 28 through operation of the input unit 28A, for example.

FIG. 9C is a diagram illustrating an example of a data structure of the fourth information. As illustrated in FIG. 9C, the fourth information is information in which the user IDs serving as the first try-on subject identification information are associated with the related user IDs serving as the second try-on subject identification information.

Returning to FIG. 6, the second storage unit 28B further stores try-on information and purchase information. Upon receipt of the try-on information from the second terminal 26, the server device 28 stores the same in the second storage unit 28B. In addition, upon receipt of the purchase information from the second terminal 26, the server device 28 stores the same in the second storage unit 28B.

FIG. 10A is a diagram illustrating an example of data structure of the try-on information, and FIG. 10B is a diagram illustrating an example of data structure of the purchase information.

The try-on information includes at least clothing identification information (clothing ID) and try-on time. In the example of FIG. 10A, the try-on information includes try-on history ID, date and time, clothing ID, user ID, and try-on time. The try-on history ID is identification information for identifying the try-on history. The date and time indicates the date and time when the clothing image of the clothing with the clothing ID included in the try-on information is virtually tried on. The user ID in the try-on information is identification information for the operator of the second terminal 26 having transmitted the try-on information. The try-on time indicates the accumulated time when the clothing image is composited with the try-on subject image and is displayed on a third display unit 26C (described later in detail) of the second terminal 26.

The purchase information includes clothing identification information (clothing ID) of the clothing in the clothing image and a signal of request for purchase. The signal of request for purchase may further include the number of clothing items to be purchased, the user ID of the purchaser (try-on subject), and the date and time when the signal of request for purchase was transmitted.

In the example of FIG. 10B, the purchase information includes purchase ID, date and time, clothing ID, quantity, and user ID. The purchase ID is identification information for identifying the purchase history. The date and time indicates the date and time when the second terminal 26 transmits the signal of request for purchase. The clothing ID is identification information of the clothing to be purchased. The quantity indicates the number of the clothing items to be purchased.

Returning to FIG. 6, the controller 28D includes a communication unit 28E, a retrieval unit 28H, a second calculator 28I, a second display controller 28J, and a second storage controller 28K. Some or all of the communication unit 28E, the retrieval unit 28H, the second calculator 28I, the second display controller 28J, and the second storage controller 28K may be implemented by causing a processing device such as a CPU to execute programs, that is, by software, or may be implemented by hardware such as an IC, or may be implemented by software and hardware in combination, for example.

The communication unit 28E is a communication interface that communicates with the first terminal 10 and the second terminal 26. The communication unit 28E includes a second reception unit 28F and a second transmission unit 28G.

The second reception unit 28F receives various kinds of data from the first terminal 10 and the second terminal 26. In this embodiment, the second reception unit 28F receives the user information and the user ID from the first terminal 10. The second reception unit 28F also receives the try-on information from the second terminal 26. The second reception unit 28F further receives the purchase information from the second terminal 26.

The second reception unit 28F also receives second information from the second terminal 26. The second information includes at least a request for execution of virtual try-on. In this embodiment, the second information includes the request for execution of virtual try-on, the password of the try-on subject operating the second terminal 26, the try-on subject identification information (try-on subject ID, hereinafter, also referred to as user ID) of the virtual try-on target, and the shooting date and time of the try-on subject image of the try-on subject.

The try-on subject identification information of the virtual try-on target may be identification information of the try-on subject operating the second terminal 26 or identification information of another try-on subject related to the try-on subject operating the second terminal 26. That is, the try-on subject selected as the virtual try-on target by the second terminal 26 is not limited to the user operating the second terminal 26 but may be any user other than the user operating the second terminal 26.

Upon receipt of the second information from the second terminal 26 via the second reception unit 28F, the second transmission unit 28G transmits third information to the second terminal 26 having transmitted the second information.

The third information includes at least the user information and the clothing image. The second transmission unit 28G may transmit all of the clothing images stored in the second storage unit 28B to the second terminal 26 or may transmit some clothing images retrieved by the retrieval unit 28H described later to the second terminal 26.

The second transmission unit 28G preferably transmits, to the second terminal 26, the third information including the user information and the clothing images respectively corresponding to the plurality of shooting angles.

It is assumed that the second reception unit 28F receives the second information including the try-on subject identification information (user ID) of the virtual try-on target. In this case, upon receipt of the second information from the second reception unit 28F, the second transmission unit 28G transmits the third information including the user information on the try-on subject identified by the try-on subject identification information (user ID) included in the second information and the clothing images to the second terminal 26 having transmitted the second information.

It is also assumed that the second reception unit 28F receives the second information including the try-on subject identification information of the virtual try-on target. In this case, the second transmission unit 28G preferably transmits the third information including the user information corresponding to the first try-on subject identification information, the user information corresponding to the second try-on subject identification information, and the clothing images to the second terminal 26 having transmitted the second information.

Specifically, the second transmission unit 28G retrieves, from the fourth information (see FIG. 9C), the same first try-on subject identification information (user ID) as the try-on subject identification information (user ID) included in the second information. Then, the second transmission unit 28G retrieves, from the fourth information (see FIG. 9C), the related user ID corresponding to the retrieved first try-on subject identification information (user ID), as the second try-on subject identification information. This retrieval may be conducted by the retrieval unit 28H.

At that time, the second transmission unit 28G may further retrieve the user ID under which the item "public view" included in the user information (see FIG. 9B) has the symbol "○" indicating that the try-on subject images are to be viewable to all the users, as the related user ID. This retrieval may be conducted by the retrieval unit 28H.

The second transmission unit 28G transmits, to the second terminal 26, the user identification information corresponding to the retrieved first try-on subject identification information (user ID) and the retrieved second try-on subject identification information (user ID).

The retrieval unit 28H retrieves the try-on subject images to be transmitted to the second terminal 26 and the clothing images to be transmitted to the second terminal 26.

For example, the retrieval unit 28H reads the try-on subject identification information (user ID) included in the second information received from the second terminal 26. Then, the retrieval unit 28H retrieves, from the second storage unit 28B, the try-on subject images included in the user information corresponding to the read user ID (see FIG. 9B).

When the retrieval unit 28H retrieves the try-on subject images, the second transmission unit 28G transmits the user information including the retrieved try-on subject images to the server device 28.

The retrieval unit 28H also reads the try-on subject identification information (user ID) included in the second information received from the second terminal 26 and the shooting date information. The retrieval unit 28H then acquires, from the second storage unit 28B, the body shape parameters corresponding to the shooting date information included in the second information, in the user information corresponding to the user ID included in the second information. The retrieval unit 28H then retrieves, from the second storage unit 28B, the clothing images of the size (body shape parameters) matching or similar to the acquired body shape parameters.

The match between the body shape parameters means that the values of the body shape parameters included in the user information and the values of the body shape parameters corresponding to the clothing images match each other. The similarity between the body shape parameters means that at least one of the body shape parameters included in the user information and at least one of the body shape parameters corresponding to the clothing images match each other or have a difference within a predetermined error range.

When the retrieval unit 28H retrieves the clothing image, upon receipt of the second information from the second terminal 26, the second transmission unit 28G preferably transmits the third information including the user information and the retrieved clothing images matching or similar to the body shape parameters included in the user information to the second terminal 26 having transmitted the second information.

The retrieval unit 28H may also retrieve the clothing images to be transmitted to the second terminal 26, depending on the preferences of the try-on subject identified by the try-on subject ID included in the second information received by the second reception unit 28F. In this case, the colors, shapes, and patterns preferred by the try-on subject may be stored in advance in the second storage unit 28B in association with the try-on subject ID. The second transmission unit 28G transmits the third information including the user information and the clothing images according to the preferences of the user with the user ID corresponding to the user information to the second terminal 26 having transmitted the second information.

When the user selects the clothing image to be tried on by operation of the second terminal 26, the retrieval unit 28H may retrieve, from the first information, the clothing images similar to the selected clothing image. The similarity to the selected clothing image means that the retrieved clothing images match the selected clothing image to be tried on in at least one of color, shape, pattern, and attribute information (manufacturer's name, price, and the like). In this case, the controller 28D further registers the colors, shapes, patterns, and the like of the clothing images in association with the clothing images in the first information.

In this case, the second transmission unit 28G preferably transmits, to the second terminal 26, the other clothing images similar to the clothing image selected as a try-on target by the second terminal 26.

The second calculator 28I calculates first charging information from the try-on information stored in the second storage unit 28B. The first charging information indicates the advertisement rate to be charged to the provider (manufacture and sales company or the like) of the virtually tried-on clothing. For example, the second storage unit 28B stores in advance the charging information per unit time. The second calculator 28I multiplies the try-on time indicated by the try-on information by the charging information per unit time at intervals of a predetermined period (for example, every one week or one month) and sets the multiplied value as first charging information.

For example, the second transmission unit 28G reads the attribute information corresponding to the clothing ID of the virtually tried-on clothing from the first information (see FIG. 7) to acquire the name of the manufacturer of the clothing. The second transmission unit 28G then transmits the first charging information to the address of the acquired manufacturer (for example, e-mail address or the like).

The second calculator 28I also calculates second charging information from the purchase information stored in the second storage unit 28B. The second charging information indicates the usage fee for the virtual try-on system to be charged to the provider (manufacture and sales company or the like) of the purchased clothing. For example, the second calculator 28I calculates 10% of the fixed price for the purchased clothing as the second charging information.

Then, for example, the second transmission unit 28G reads the attribute information corresponding to the clothing ID of the purchased clothing from the first information (see FIG. 7) to acquire the name of the manufacturer of the clothing. The second transmission unit 28G then transmits the second charging information to the address of the manufacturer with the acquired name (for example, e-mail address or the like).

The second display controller 28J controls the second display unit 28C to display various images. The second storage controller 28K stores various kinds of data in the second storage unit 28B.

Specifically, the second storage controller 28K stores the user information received from the first terminal 10 in association with the user ID in the second storage unit 28B. When the user information includes the shooting date information, the second storage controller 28K preferably stores, for each of the individual user IDs and each of pieces of shooting date information, the user information in the second storage unit 28B (see FIG. 9B).

The second storage controller 28K also stores the try-on information and the purchase information received from the second terminal 26 in the second storage unit 28B.

Next, the second terminal 26 will be described. The second terminal 26 is a known personal computer. The second terminal 26 is a portable terminal. The second terminal 26 is a terminal operated by the user to receive the virtual try-on service. The second terminal 26 is also applicable to a portable terminal with telephone function and the like.

Figure 11:
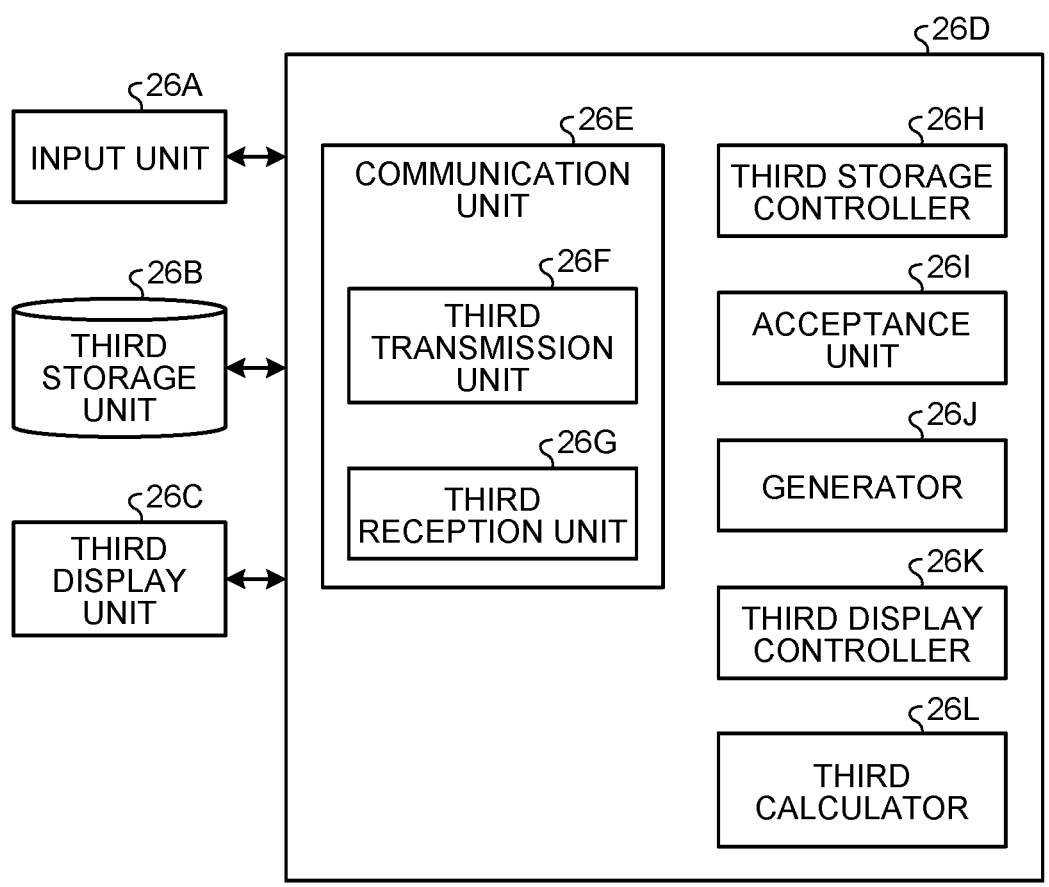
FIG. 11 is a functional block diagram of a second terminal.

FIG. 11 is a functional block diagram of the second terminal 26.

The second terminal 26 includes an input unit 26A, a third storage unit 26B, a third display unit 26C, and a controller 26D. The input unit 26A, the third storage unit 26B, and the third display unit 26C are connected to the controller 26D so as to be capable of exchanging signals.

The input unit 26A accepts input from the user. The input unit 26A is a device for the user to perform various input operations. The input unit 26A may be one of a mouse, a button, a remote control, a keyboard, a sound recognition device such as a microphone, and image recognition devices, or a combination of some of them, for example.

In this embodiment, the input unit 26A accepts from the user input of various kinds of information such as the user ID of the user operating the second terminal 26, the password of the user operating the second terminal 26, the try-on subject identification information (try-on subject ID, that is, the user ID) of the virtual try-on target, and selection of the clothing images to be tried on.

The third display unit 26C displays various images. In this embodiment, the third display unit 26C displays a list of clothing images to be tried on so that the user can select. The third display unit 26C also displays the composite image formed by superimposing the clothing image on the try-on subject image.

The input unit 26A and the third display unit 26C may be integrated. Specifically, the input unit 26A and the third display unit 26C may be configured as a user interface (UI) unit including both the input function and the display function. The UI unit includes a touch panel-equipped LCD (liquid crystal display) and the like.

The third storage unit 26B stores various kinds of information.

The controller 26D includes a communication unit 26E, a third storage controller 26H, an acceptance unit 26I, a generator 26J, a third display controller 26K, and a third calculator 26L. Some or all of the communication unit 26E, the third storage controller 26H, the acceptance unit 26I, the generator 26J, the third display controller 26K, and the third calculator 26L may be implemented by causing a processing device such as a CPU to execute programs, that is, by software, or may be implemented by hardware such as an IC, or may be implemented by software and hardware in combination.

The communication unit 26E is an interface that communicates with the server device 28. The communication unit 26E may further communicate with the first terminal 10.

The communication unit 26E includes a third transmission unit 26F and a third reception unit 26G.

The third transmission unit 26F transmits various kinds of information to an external device such as the server device 28. In this embodiment, the third transmission unit 26F transmits the second information, the try-on information, and the purchase information to the server device 28. The third reception unit 26G receives the third information from the server device 28.

The third storage controller 26H stores various kinds of information in the third storage unit 26B. The third storage controller 26H stores the received third information in the third storage unit 26B. Accordingly, the second terminal 26 can provide the virtual try-on service using the third information received from the server device 28.

The third display controller 26K displays various kinds of information on the third display unit 26C.

For example, the third display controller 26K displays an acceptance screen or a try-on screen on the third display unit 26C. The acceptance screen is a screen for accepting input of the user ID and the password of the user operating the second terminal 26.

The try-on screen is a screen including a plurality of clothing images for the try-on subject to select the clothing image to be tried on. The try-on screen is a screen including the composite image formed by superimposing the clothing image selected as a try-on target on the try-on subject image.

Figure 12A:
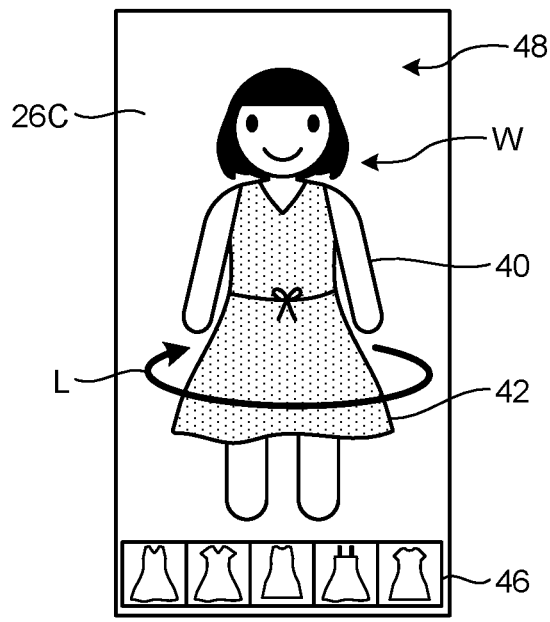
FIGS. 12A and 12B are diagrams illustrating examples of try-on screens.
Figure 12B:
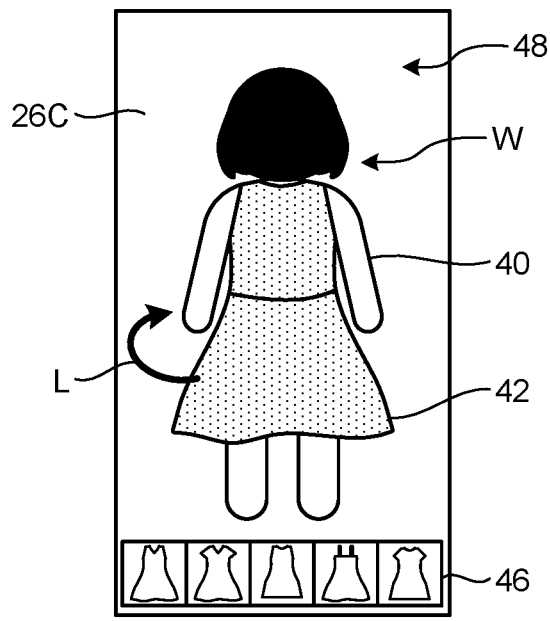

FIGS. 12A and 12B are diagrams illustrating examples of try-on screens displayed on the third display unit 26C. As illustrated in FIG. 12A, a try-on screen 48 is displayed on the third display unit 26C of the second terminal 26. The try-on screen 48 includes a list of clothing images 46, the composite image W of the try-on subject image 40 and the clothing image 42, and the like.

Returning to FIG. 11, the acceptance unit 26I accepts an operation instruction by the user from the input unit 26A. In this embodiment, the acceptance unit 26I accepts a selection of a clothing image to be tried on from the input unit 26A. For example, the third display controller 26K displays the list of clothing images received from the server device 28 on the second terminal 26. The user operates the input unit 26A to select a clothing image to be tried on from the list of clothing images displayed. Then, the acceptance unit 26I accepts the selection of the clothing image to be tried on from the input unit 26A.

The acceptance unit 26I further accepts an instruction for rotation by the user. When accepting the instruction for rotation, the third display controller 26K rotates the composite image displayed on the third display unit 26C according to the instruction for rotation.

For example, it is assumed that the composite image W illustrated in FIG. 12A is displayed on the third display unit 26C. In this state, the user operates the input unit 26A to give an instruction for rotation in a direction of arrow L. In this case, the acceptance unit 26I accepts the instruction for rotation in the direction of arrow L. Then, the third display controller 26K rotates the composite image W in the direction of arrow L according to the instruction for rotation (see FIG. 12B).

Returning to FIG. 11, the generator 26J generates a composite image by superimposing the selected clothing image on the try-on subject image at the position indicated by the composite position information, based on the third information stored in the third storage unit 26B.

The composite position information included in the third information indicates the rectangular composite target area 56 that is included in the try-on subject image 40 to surround the try-on subject area 40A indicative of the try-on subject P as illustrated in FIG. 4. In this embodiment, as illustrated in FIGS. 8A and 8B, the clothing areas 42A and 42B included in the clothing image 42 are arranged at positions where the human body wears the clothing. The clothing image 42 also includes area information indicative of the rectangular virtual human body area 57 surrounding the human body.

Accordingly, the generator 26J generates the composite image W such that the virtual human body area 57 in the clothing image selected as a try-on target is enlarged or reduced and positioned in alignment with the composite target area 56 in the try-on subject image of the try-on subject. The generator 26J thus can generate easily and quickly the composite image W adjusted in position at high accuracy.

Descriptions will be continuously given with reference to FIG. 11. The third calculator 26L calculates the try-on time. The try-on time means the accumulated time during which the composite image, which is generated by superimposing the selected clothing image on the try-on subject image, is displayed on the third display unit 26C. For example, the clothing image selected as a try-on target may be changed as appropriate by the user operating the input unit 26A. Accordingly, the third calculator 26L calculates the accumulated time during which the composite image, which is generated by superimposing the selected clothing image on the try-on subject image, is displayed on the third display unit 26C as the try-on time.

Next, a procedure for the virtual try-on process executed in the virtual try-on system 1 will be described.

Figure 13:
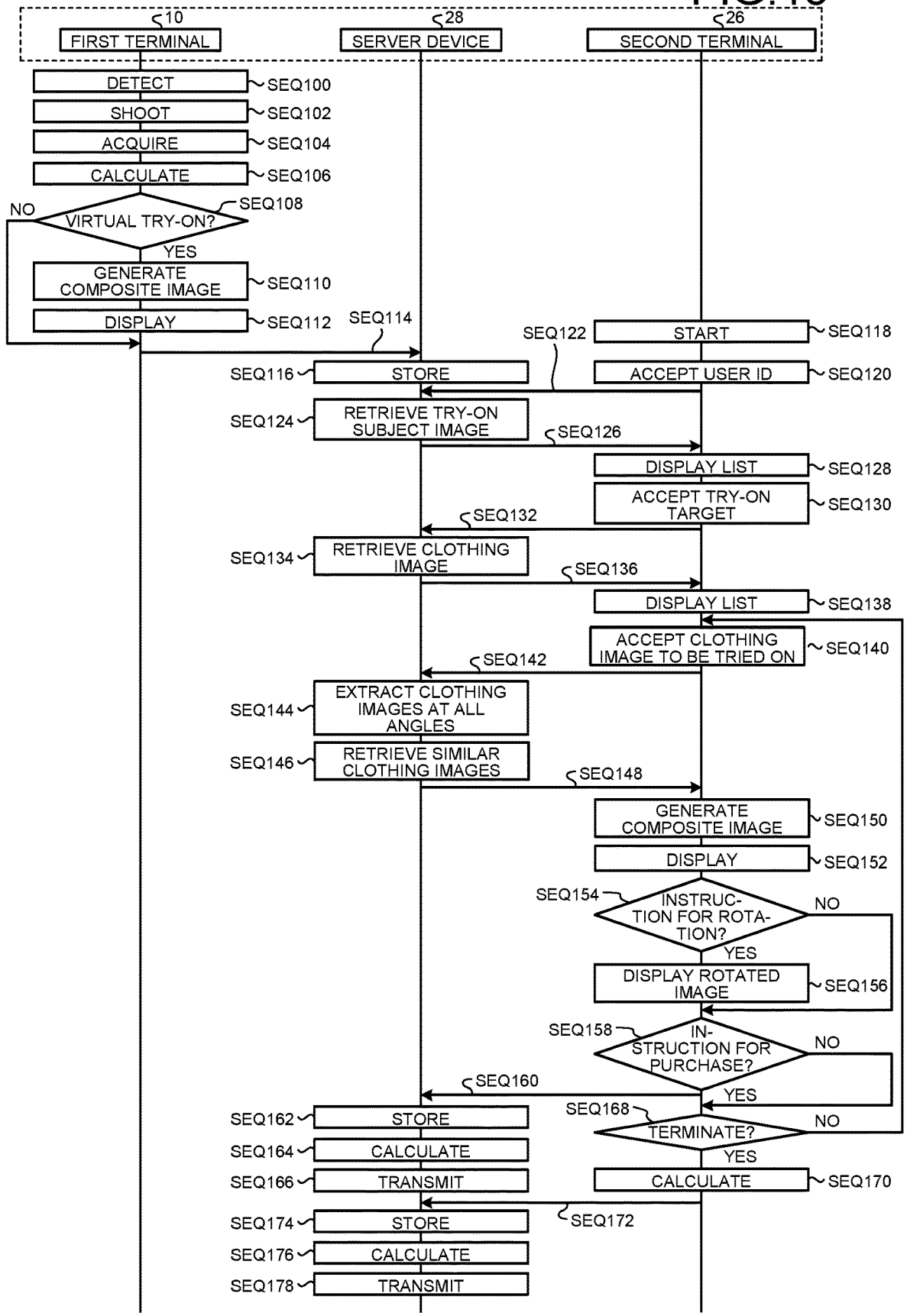
FIG. 13 is a sequence diagram illustrating a procedure for a virtual try-on process.

FIG. 13 is a sequence diagram illustrating the procedure for the virtual try-on process executed in the virtual try-on system 1.

First, the detector 12C of the first terminal 10 detects that the try-on subject is positioned within the area S facing the first display unit 18 (SEQ100).

Next, the shooting unit 20 shoots the try-on subject positioned within the area S (SEQ102). The acquisition unit 12A acquires the try-on subject images and the depth maps from the shooting unit 20 (SEQ104). At that time, in this embodiment, the acquisition unit 12A acquires the try-on subject images corresponding to the shooting angles and the body shape parameters of the try-on subject as described above.

Next, the first calculator 12B calculates composite position information indicative of the composite position of the clothing image for the try-on subject images corresponding to the shooting angles acquired at SEQ104 (SEQ106).

Next, the controller 12 determines whether the virtual try-on is to be done in the first terminal 10 (SEQ108). The controller 12 stores mode information indicating whether the virtual try-on is to be done in advance in the first storage unit 14, for example. The mode information is changeable by the user giving an operation instruction. The controller 12 reads the mode information to make a determination at SEQ108.

When the virtual try-on is not to be done in the first terminal 10 (SEQ108: No), the process moves to SEQ114 described later.

When the virtual try-on is to be done in the first terminal 10 (SEQ108: Yes), the process moves to SEQ110. At SEQ110, the composite unit 12D generates the composite image W by compositing the try-on subject image acquired by the acquisition unit 12A at SEQ104 with the clothing image stored in advance in the first storage unit 14 (SEQ110). Then, the first display controller 12E displays the composite image W on the first display unit 18 (SEQ112).

By performing processes at SEQ100 to SEQ112, as illustrated in FIG. 5, the composite image W of the clothing image of the clothing 52 arranged in the show window 50 and the try-on subject image of the user can be displayed on the first display unit 18 for the user facing the show window 50, for example. In this case, the user can check the state when he or she virtually tries on the clothing by the composite image W displayed on the first display unit 18, without having to perform any operation.

Similarly to the second terminal 26, the first terminal 10 may also perform a process for displaying the composite image formed by compositing the clothing image selected by the user with the try-on subject image.

Next, the first transmission unit 12G of the first terminal 10 transmits the user information and the user ID to the server device 28 (SEQ114). The user information includes the try-on subject images respectively corresponding to the plurality of shooting angles acquired at SEQ104, the body shape parameters corresponding to the try-on subject in the try-on subject images, the shooting date information of the plurality of try-on subject images, the depth maps used for calculation of the body shape parameters, the password, and a plurality of pieces of composite position information respectively corresponding to the plurality of try-on subject images calculated at SEQ106, for example.

The second reception unit 28F of the server device 28 receives the user information and the user ID from the first terminal 10 (SEQ116). The second storage controller 28K of the server device 28 stores the received user information and user ID in association with each other in the second storage unit 28B.

The processes at SEQ100 to SEQ116 will be repeatedly executed each time the try-on subject image is shot by the shooting unit 20. Accordingly, the second storage controller 28K of the server device 28 stores the user information corresponding to the user IDs of the plurality of try-on subjects (users). When the user information includes shooting date information, the second storage controller 28K stores a plurality of pieces of user information with different shooting dates for the same user (one user identified by one user ID) as described above.

Meanwhile, a virtual try-on application is started on the second terminal 26 by the user operating the second terminal 26 (SEQ118). Then, the third display controller 26K displays the acceptance screen on the third display unit 26C. The acceptance screen is a screen for accepting input of the user ID and the password of the user operating the second terminal 26 as described above.

The acceptance unit 26I accepts the user ID and the password from the input unit 26A (SEQ120). Then, the third reception unit 26G transmits the second information to the server device 28 (SEQ122). In this case, the second information includes the request for execution of virtual try-on, and the password and user ID of the user operating the second terminal 26 accepted at SEQ120.

The second reception unit 28F of the server device 28 receives the second information from the second terminal 26. Then, the retrieval unit 28H retrieves the try-on subject image from the second storage unit 28B (SEQ124). More specifically, the retrieval unit 28H retrieves the try-on subject image included in the user information corresponding to the user ID included in the received first information (see FIG. 9B). The retrieval unit 28H also retrieves, from the fourth information, the user ID related to the user ID included in the received first information (see FIG. 9C). The retrieval unit 28H then retrieves the try-on subject image included in the user information corresponding to the retrieved user ID (see FIG. 9B).

Accordingly, the retrieval unit 28H retrieves the try-on subject image included in the user information on the user operating the second terminal 26 (for example, a grandfather) and the try-on subject image included in the user information on another user (for example, a grandchild) related to the user.

The second storage unit 28B stores the user information for the individual shooting date information as described above. Accordingly, the retrieval unit 28H retrieves, for each user, a plurality of try-on subject images with different shooting dates. Specifically, the retrieval unit 28H retrieves a plurality of try-on subject images of each user shot at different ages, for example.

Next, the second transmission unit 28G transmits a list of the retrieved try-on subject images of the respective users to the second terminal 26 (SEQ126). At that time, the second transmission unit 28G transmits, to the second terminal 26, the retrieved try-on subject images corresponding to the plurality of shooting dates of each user.

When the third reception unit 26G of the second terminal 26 receives the list of try-on subject images, the third display controller 26K displays the list of try-on subject images on the third display unit 26C (SEQ128).

The user operating the second terminal 26 uses the input unit 26A to select the try-on subject image of the try-on subject as a virtual try-on target from among the try-on subject images displayed on the third display unit 26C. Then, the acceptance unit 26I accepts the try-on subject ID of the selected try-on subject image and the shooting date information of the selected try-on subject image as the try-on subject ID of the try-on subject as a try-on target and the shooting date information (SEQ130). Then, the third transmission unit 26F transmits the accepted try-on subject ID (user ID) and shooting date information to the server device 28 (SEQ132).

Accordingly, transmitted to the server device 28 are the try-on subject ID of the user operating the second terminal 26 or another user related to the user (relative, friend, acquaintance, show-business person, or the like) as a try-on target and the shooting date information of the try-on subject image of the try-on subject identified by the try-on subject ID.

The second reception unit 28F of the server device 28 receives the try-on subject ID of the try-on target and the shooting date information from the second terminal 26. Then, the retrieval unit 28H of the server device 28 retrieves the clothing images from the second storage unit 28B (SEQ134).

The retrieval unit 28H of the server device 28 acquires, from the second storage unit 28B, the body shape parameters corresponding to the shooting date information received at SEQ132 in the user information corresponding to the try-on subject ID (user ID) received at SEQ132, for example. The retrieval unit 28H then retrieves, from the second storage unit 28B, the clothing images of the size (body shape parameters) matching or similar to the acquired body shape parameters (SEQ134).

Accordingly, the clothing images suited for the body shape of the try-on subject in the try-on subject image shot at the selected shooting date are retrieved.

That is, it is assumed that the user operating the second terminal 26 selects his or her try-on subject image shot ten years ago as a try-on subject, for example. In this case, the retrieval unit 28H retrieves the clothing images suited to the body shape of the try-on subject in the try-on subject image shot ten years ago.

It is also assumed that the user operating the second terminal 26 selects the try-on subject image of another user, a grandchild of the try-on subject, as a try-on subject, for example. In this case, the retrieval unit 28H retrieves the clothing images suited to the body shape of the grandchild.

The second transmission unit 28G of the server device 28 transmits the list of clothing images retrieved at SEQ134 to the second terminal 26 (SEQ136). In this embodiment, at SEQ136, the second transmission unit 28G transmits, to the second terminal 26, the clothing images retrieved at SEQ134 corresponding to a certain shooting angle (for example, 0°), out of the clothing images corresponding to the plurality of shooting angles, as an example. Alternatively, the second transmission unit 28G may transmit, to the second terminal 26, the clothing images at all the shooting angles at SEQ136.

The third reception unit 26G of the second terminal 26 receives the clothing images from the server device 28. Then, the third display controller 26K of the second terminal 26 displays, on the third display unit 26C, the try-on screen including the list of received clothing images and the try-on subject image (SEQ138). The try-on subject image included in the try-on screen displayed at SEQ138 is the try-on subject image corresponding to the try-on subject ID and the shooting date information received at SEQ130.

Next, the acceptance unit 26I of the second terminal 26 accepts a selection of the clothing image as a try-on target from the input unit 26A (SEQ140). The user operates the input unit 26A to select the clothing image as a try-on target from the list of clothing images displayed on the third display unit 26C. Accordingly, the acceptance unit 26I accepts the selection of the clothing image as a try-on target from the input unit 26A. Then, the third transmission unit 26F of the second terminal 26 transmits the clothing ID of the selected clothing image to the server device 28 (SEQ142).

Next, the second reception unit 28F of the server device 28 accepts the clothing ID. The retrieval unit 28H of the server device 28 retrieves, from the first information, the clothing images respectively corresponding to all the shooting angles and corresponding to the accepted clothing ID (SEQ144).

The retrieval unit 28H of the server device 28 also retrieves, from the first information, other clothing images similar to the clothing image selected as a try-on target by the second terminal 26 (the clothing image identified by the clothing ID received at SEQ142) (SEQ146).

The second transmission unit 28G of the server device 28 transmits, to the second terminal 26, the clothing images at all the shooting angles corresponding to the clothing ID and the other clothing images similar to the clothing images with the clothing ID (SEQ148).

The third reception unit 26G of the second terminal 26 receives from the server device 28 the clothing images to be tried on at all the shooting angles accepted at SEQ140 and the other clothing images similar to the clothing images.

The generator 26J of the second terminal 26 generates a composite image (SEQ150). At SEQ150, the generator 26J reads the try-on subject images respectively corresponding to all the shooting directions of the try-on subject accepted as the try-on target at SEQ130 and the clothing images at all the shooting angles of the try-on target accepted at SEQ148. The generator 26J then composites the read try-on subject image and the clothing image having the same shooting angle, to generate the composite images W corresponding to the respective shooting angles. Accordingly, the generator 26J generates the composite images W, which are respectively corresponding to all the shooting angles, of the try-on subject images and the clothing images selected as try-on targets.

At that time, the generator 26J generates the composite images W such that the virtual human body area 57 in the clothing image selected as a try-on target is enlarged or reduced and positioned in alignment with the area 56 in the try-on subject image of the try-on subject as described above. Accordingly, the generator 26J can generate easily and quickly the composite images W adjusted in position at high accuracy.

The third display controller 26K displays the try-on screen 48 including the composite image generated at SEQ150 on the third display unit 26C (SEQ152). The third display controller 26K also displays, on the try-on screen 48, the list of other clothing images 46 similar to the clothing image used for composition, received from the server device 28 at SEQ148. Accordingly, the third display unit 26C displays the try-on screen 48 illustrated in FIG. 12A, for example.

That is, the third display unit 26C displays the composite image in which the clothing image selected by the user is superimposed on the try-on subject image of the try-on subject selected by the user and shot at the shooting date selected by the user. The third display unit 26C also displays the list of other clothing images 46 similar to the clothing image selected by the user as the try-on target in a selectable manner.

Next, the acceptance unit 26I determines whether an instruction for rotation is received from the user (SEQ154). The acceptance unit 26I makes a determination at SEQ154 by determining whether an instruction for rotation is received from the input unit 26A. When no instruction for rotation is received (SEQ154: No), the process moves to SEQ158. Meanwhile, when an instruction for rotation is received (SEQ154: Yes), the third display controller 26K rotates the composite image displayed on the third display unit 26C according to the instruction for rotation (SEQ156).

It is assumed that the user operates the input unit 26A to give an instruction for rotation of the composite image W illustrated in FIG. 12A in the direction of arrow L. In this case, the third display controller 26K rotates the composite image W in the direction of arrow L according to the instruction for rotation (see FIG. 12B).

Next, the acceptance unit 26I of the second terminal 26 determines whether an instruction for purchase is received (SEQ158). The acceptance unit 26I determines whether the user has operated the input unit 26A to give an instruction for purchase of the clothing in the clothing image displayed on the third display unit 26C. When no instruction for purchase is received (SEQ158: No), the process moves to SEQ168. When an instruction for purchase is received (SEQ158: Yes), the third transmission unit 26F transmits the purchase information including the clothing identification information of the clothing in the clothing image the user has given the instruction for purchase and a signal of request for purchase to the server device 28 and the website selling the clothing in the clothing image (SEQ160).

When the second reception unit 28F of the server device 28 receives the purchase information, the second storage controller 28K of the server device 28 stores the purchase information in the second storage unit 28B (SEQ162). The second calculator 28I of the server device 28 calculates the second charging information at predetermined time intervals (SEQ164). The second transmission unit 28G of the server device 28 transmits the calculated second charging information to the manufacturer of the purchased clothing (SEQ166). Specifically, the second transmission unit 28G transmits the second charging information to the server operating the mail-order website of the manufacturer via the communication line 34, for example.

Next, the acceptance unit 26I of the second terminal 26 determines whether an instruction for termination of virtual try-on is received (SEQ168). The acceptance unit 26I makes a determination at SEQ168 by determining whether a signal indicative of termination of virtual try-on is received from the input unit 26A.

When no instruction for termination of virtual try-on is received (SEQ168: No), the process returns to SEQ140. In contrast, when an instruction for termination of virtual try-on is received (SEQ168: Yes), the third calculator 26L of the second terminal 26 calculates the accumulated time during which the composite image, which is generated by superimposing the clothing image selected at SEQ140 on the try-on subject image, is displayed on the third display unit 26C, as the try-on time (SEQ170).

The third transmission unit 26F of the second terminal 26 transmits, to the server device 28, the try-on information including the try-on time calculated at SEQ170, the clothing ID of the clothing image of which the try-on time was calculated, and the user ID of the second terminal 26 (SEQ172).

Upon receipt of the try-on information, the second reception unit 28F of the server device 28 stores the same in the second storage unit 28B (SEQ174). The second calculator 28I of the server device 28 calculates the first charging information from the try-on information (SEQ176). The second transmission unit 28G of the server device 28 transmits the calculated first charging information to the manufacturer of the clothing tried on (SEQ178). Specifically, the second transmission unit 28G transmits the first charging information via the communication line 34 to the server operating the mail-order website of the manufacturer, for example. Accordingly, this sequence is terminated.

In the sequence illustrated in FIG. 13, the server device 28 transmits, to the second terminal 26, the try-on subject image, the clothing image, the clothing images at all angles, and the similar clothing images according to the request from the second terminal 26 (refer to SEQ122 to SEQ148). Alternatively, upon receipt of the first information from the second terminal 26 at SEQ122, the server device 28 may transmit the third information including the user information and the clothing image at one time to the second terminal 26.

As described above, the virtual try-on system 1 in this embodiment includes the first terminal 10 installed at a predetermined place, the server device 28 connected to the first terminal 10, and the portable second terminal 26 connected to the server device 28. The first terminal 10 includes the acquisition unit 12A, the first calculator 12B, and the first transmission unit 12G. The acquisition unit 12A acquires the try-on subject image of the try-on subject. The first calculator 12B calculates the composite position information indicative of the composite position of the clothing image in the try-on subject image. The first transmission unit 12G transmits the user information including the try-on subject image and the composite position information to the server device 28.

The server device 28 includes the second storage unit 28B, the second reception unit 28F, and the second transmission unit 28G. The second storage unit 28B stores in advance the first information including the clothing image. The second reception unit 28F receives the user information from the first terminal 10. Upon receipt of the second information including the signal of execution for request virtual try-on from the second terminal 26, the second transmission unit 28G transmits the third information including the user information and the clothing image to the second terminal 26 having transmitted the second information.

The second terminal 26 includes the third transmission unit 26F, the third reception unit 26G, and the third storage unit 26B. The third transmission unit 26F transmits the second information to the server device 28. The third reception unit 26G receives the third information from the server device 28. The third storage unit 26B stores the received third information.

Accordingly, the portable second terminal 26 can use the clothing image included in the third information received from the server device 28 and the try-on subject image and the composite position information included in the user information, to generate a composite image by compositing the try-on subject image with the clothing image.

Therefore, the virtual try-on system 1 in this embodiment can provide a virtual try-on service at an arbitrary place.

The second terminal 26 also includes the acceptance unit 26I, the generator 26J, and the third display unit 26C. The acceptance unit 26I accepts a selection of the clothing image as to be tried on. The generator 26J generates the composite image by compositing the selected clothing image with the try-on subject image at the position indicated by the composite position information based on the third information. The third display unit 26C displays the composite image.

Accordingly, the virtual try-on system 1 can provide a virtual try-on service at an arbitrary place.

The composite position information preferably indicates the composite target area of the clothing image in the try-on subject image. Accordingly, in addition to the foregoing advantage, the virtual try-on system 1 can reduce the information for use in composition of the clothing image.

The acquisition unit 12A of the first terminal 10 acquires the try-on subject image and the body shape parameters indicative of the body shape of the try-on subject in the try-on subject image. The first transmission unit 12G of the first terminal 10 transmits the user information further including the body shape parameters to the server device 28. The server device 28 further includes the retrieval unit 28H. The retrieval unit 28H retrieves the clothing images of the sizes matching or similar to the body shape parameters included in the received user information. Upon receipt of the second information from the second terminal 26, the second reception unit 28F of the server device 28 transmits the third information including the user information and the retrieved clothing images matching or similar to the body shape parameters included in the user information to the second terminal 26 having transmitted the second information.

Accordingly, the user operating the second terminal 26 can select the clothing image to be composited with the try-on subject image from among the clothing images of the sizes corresponding to the body shape of the try-on subject in the try-on subject image.

The acquisition unit 12A of the first terminal 10 acquires the try-on subject images obtained by shooting the try-on subject at a plurality of different shooting angles. The first calculator 12B of the first terminal 10 calculates the composite position information for each of the try-on subject images respectively corresponding to the plurality of shooting angles. The first transmission unit 12G of the first terminal 10 transmits, to the server device 28, the user information including the try-on subject images respectively corresponding to the plurality of shooting angles.

The second storage unit 28B of the server device 28 stores in advance the first information including the clothing images respectively corresponding to the plurality of shooting angles. Upon receipt of the second information, the second transmission unit 28G of the server device 28 transmits the third information including the user information and the clothing images respectively corresponding to the plurality of shooting angles to the second terminal 26.

The second terminal 26 thus acquires not only the try-on subject image and the clothing image shot from one direction but also the plurality of try-on subject images and the plurality of clothing images shot in the plurality of shooting directions. Accordingly, in addition to the foregoing advantages, the virtual try-on system 1 in this embodiment can provide the composite images from the try-on subject images shot at various shooting angles.

The shooting angles are preferably angles when the try-on subject is rotated by 360° with the body of the try-on subject as a rotation axis. Accordingly, in addition to the foregoing advantages, the virtual try-on system 1 in this embodiment can provide composite images in which the try-on subject in the try-on subject image is viewed from all sides such as the front side, the lateral side, and the back side for example.

The acceptance unit 26I of the second terminal 26 further accepts an instruction for rotation from the user. The third display controller 26K of the second terminal 26 rotates the composite image displayed on the third display unit 26C according to the instruction for rotation. Accordingly, in addition to the foregoing advantages, the virtual try-on system 1 in this embodiment can provide composite images in which the try-on subject in the try-on subject image is viewed from all sides such as the front side, the lateral side, and the back side for example.

The third transmission unit 26F of the second terminal 26 transmits, to the server device 28, the second information further including the try-on subject identification information (the try-on subject ID and the user ID) of the virtual try-on target. Upon receipt of the second information, the second transmission unit 28G of the server device 28 transmits, to the second terminal 26 having transmitted the second information, the third information including the user information on the try-on subject identified by the try-on subject identification information (try-on subject ID) included in the received second information and the clothing image.

Accordingly, in addition to the foregoing advantages, the virtual try-on system 1 in this embodiment can use, as a target to be composed with the clothing image, the try-on subject image of an arbitrary try-on subject being a virtual try-on target.

The third transmission unit 26F of the second terminal 26 transmits, to the server device 28, the second information further including the try-on subject identification information (try-on subject ID) of the try-on subject that operates the second terminal 26. The second storage unit 28B of the server device 28 further stores the fourth information in which the first try-on subject identification information (user ID) of the try-on subject and the second try-on subject identification information (related user ID) of another try-on subject related to the try-on subject are associated with each other. Upon receipt of the second information, the second reception unit 28F of the server device 28 transmits, to the second terminal 26 having transmitted the second information, the third information including the user information corresponding to the first try-on subject identification information that is the try-on subject identification information (try-on subject ID and user ID) included in the second information, the user information corresponding to the second try-on subject identification information, and the clothing image.

Accordingly, in addition to the foregoing advantages, the virtual try-on system 1 in this embodiment can use, as a target to be composed with the clothing image, both of the try-on subject image of an arbitrary try-on subject that is a virtual try-on target and the try-on subject image of another try-on subject related to the try-on subject.

The first transmission unit 12G of the first terminal 10 transmits the user information further including the shooting date information of the try-on subject image to the server device 28. The second storage controller 28K of the server device 28 stores, in the second storage unit 28B, the received user information for the individual shooting date information included in the user information.

Accordingly, in addition to the foregoing advantages, the virtual try-on system 1 in this embodiment can use, as a target to be composed with the clothing image, the try-on subject image, which corresponds to the selected shooting date, of an arbitrary try-on subject being a virtual try-on target.

The second terminal 26 further includes the third calculator 26L. The third calculator 26L calculates the accumulated time during which the composite image, which is generated by superimposing the selected clothing image on the try-on subject image, is displayed on the third display unit 26C as try-on time. The third transmission unit 26F of the second terminal 26 further transmits, to the server device 28, the try-on information including the clothing identification information (clothing ID) of the clothing in the clothing image and the try-on time. The second reception unit 28F of the server device 28 further receives the try-on information from the second terminal 26.

Accordingly, in addition to the foregoing advantages, in this embodiment, the administrator of the server device 28 can use the try-on information for sales promotion, analysis of customer information, and the like. The second calculator 28I of the server device 28 may calculate the first charging information using the try-on information.

The acceptance unit 26I of the second terminal 26 further accepts the request for purchase of the clothing in the clothing image. The third transmission unit 26F of the second terminal 26 transmits, to the server device 28, the purchase information including the clothing identification information (clothing ID) of the clothing in the clothing image and the signal of request for purchase. The second reception unit 28F of the server device 28 further receives the purchase information from the second terminal 26.

Accordingly, in addition to the foregoing advantages, in this embodiment, the administrator of the server device 28 can use the purchase information for sales promotion, analysis of customer information, and the like. The second calculator 28I of the server device 28 may calculate the second charging information using the purchase information.

The first terminal 10 also includes the detector 12C and the first display controller 12E. The detector 12C detects that the try-on subject is positioned in the predetermined area S in the real space. When the try-on subject is positioned in the area S, the first display controller 12E displays, on the first display unit 18, the composite image in which the try-on subject image of the try-on subject acquired by the acquisition unit 12A is composited with the clothing image stored in advance.

Accordingly, in addition to the foregoing advantages, the virtual try-on system 1 in this embodiment can display, on the first display unit 18, the state where the user virtually tries on the clothing viewed by the user, without requesting the user to perform any special operation.

The first calculator 12B may be included in the server device 28. In this case, the first terminal 10 does not include the first calculator 12B. The first transmission unit 12G of the first terminal 10 transmits the user information including the try-on subject image to the server device 28. The first calculator 12B included in the server device 28 calculates the composite position information indicative of the composite position of the clothing image in the try-on subject image included in the user information received by the second reception unit 28F. Upon receipt of the second information from the second terminal 26, the second transmission unit 28G transmits the third information including the user information further including the composite position information and the clothing image to the second terminal 26 having transmitted the second information.

Figure 14:
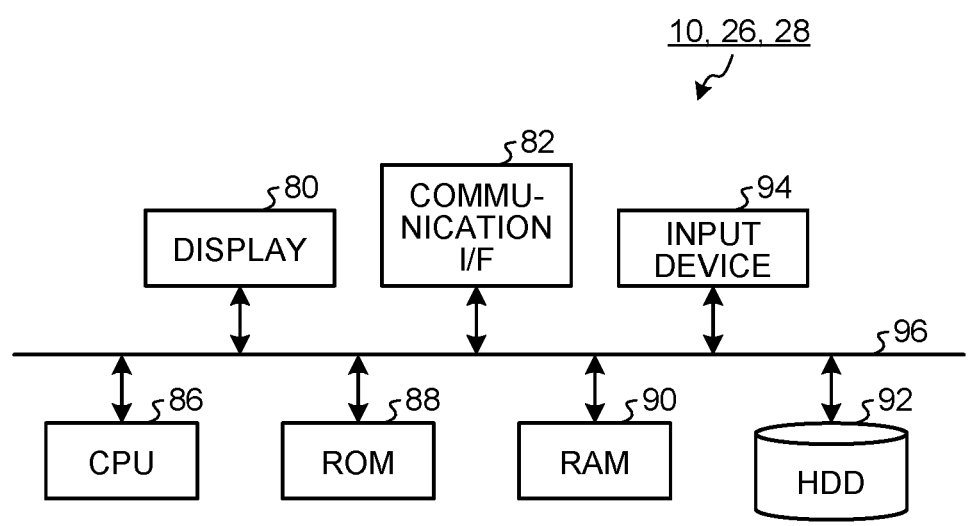
FIG. 14 is a block diagram illustrating a hardware configuration example.

Next, a hardware configuration of the first terminal 10, the second terminal 26, and the server device 28 in this embodiment will be described. FIG. 14 is a block diagram illustrating a hardware configuration example of the first terminal 10, the second terminal 26, and the server device 28 in this embodiment.

In the first terminal 10, the second terminal 26, and the server device 28 in this embodiment, a display 80, a communication I/F 82, an input device 94, a CPU 86, a ROM (read only memory) 88, a RAM (random access memory) 90, an HDD 92, and the like are connected together via a bus 96, which forms a hardware configuration using a general computer.

The CPU 86 is an arithmetic operation device that controls the operations of the first terminal 10, the second terminal 26, and the server device 28. The RAM 90 stores data necessary for various processes by the CPU 86. The ROM 88 stores computer programs and others for implementing the various processes by the CPU 86. The HDD 92 stores data to be held in the first storage unit 14, the second storage unit 28B, and the third storage unit 26B described above. The communication I/F 82 is an interface that connects to an external device or an external terminal via a communication line or the like to exchange data with the connected external device or external terminal. The display 80 is equivalent to the first display unit 18, the second display unit 28C, and the third display unit 26C described above. The input device 94 accepts an operation instruction from the user.

In this embodiment, the programs for executing the various processes at the first terminal 10, the second terminal 26, and the server device 28 are incorporated in advance into the ROM 88 or the like.

In this embodiment, the programs to be executed in the first terminal 10, the second terminal 26, and the server device 28 may be saved in files installable or executable at the foregoing devices and recorded in a computer-readable recording medium such as a CD-ROM, a flexible disk (FD), a CD-R, or a DVD (digital versatile disk).

In this embodiment, the programs to be executed in the first terminal 10, the second terminal 26, and the server device 28 may be stored in a computer connected to a network such as the internet and provided by downloading the programs via the network. In this embodiment, the programs to be executed in the first terminal 10, the second terminal 26, and the server device 28 may be provided or distributed via a network such as the internet.

In this embodiment, the programs for implementing the various processes to be executed in the first terminal 10, the second terminal 26, and the server device 28 may be formed such that the foregoing components are generated on a main storage device.

The various kinds of information stored in the HDD 92 may be stored in an external device. In this case, the external device and the CPU 86 are connected via a network or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A virtual try-on system comprising:
a first terminal installed at a predetermined place;
a server device connected to the first terminal; and
a second terminal that is portable and connected to the server device, wherein the first terminal comprises:
at least one hardware processor configured to:
acquire a try-on subject image of a try-on subject from a shooting unit;
calculate composite position information indicative of a composite position of a clothing image in the try-on subject image; and
transmit, to the server device, user information including the try-on subject image and the composite position information, wherein, to calculate the composite position information, the at least one hardware processor of the first terminal is configured to:
calculate a composite target area that surrounds at least a portion of an area indicative of the try-on subject; and
determine a position coordinate of one apex of the composite target area and distances from the one apex to two apexes continuous from the one apex,
the server device comprises:
a second storage unit configured to store in advance first information including a clothing image; and
at least one hardware processor configured to:
receive the user information from the first terminal; and
upon receipt of second information including a signal of request for execution of virtual try-on from the second terminal, transmit third information including the user information and the clothing image to the second terminal having transmitted the second information, and
the second terminal comprises:
at least one hardware processor configured to:
transmit the second information to the server device; and
receive the third information from the server device; and
a third storage unit configured to store the received third information wherein
the hardware processor of the second terminal is further configured to:
accept a selection of the clothing image as a try-on target; and
generate a composite image by compositing the selected clothing image with the try-on subject image at a position indicated by the composite position information based on the third information; and
the second terminal further comprises a third display unit configured to display the composite image,
the hardware processor of the second terminal is further configured to calculate an accumulated time during which the composite image, which is generated by superimposing the selected clothing image on the try-on subject image, is displayed on the third display unit as try-on time,
the hardware processor of the second terminal further transmits, to the server device, try-on information including clothing identification information of the clothing in the clothing image and the try-on time, and
the hardware processor of the server device further receives the try-on information from the second terminal.

2. The system according to claim 1, wherein the composite position information indicates a composite target area of the clothing image in the try-on subject image.

3. The system according to claim 1, wherein
the hardware processor of the first terminal acquires the try-on subject image and a body shape parameter indicative of a body shape of the try-on subject in the try-on subject image,
the hardware processor of the first terminal transmits the user information further including the body shape parameter to the server device, the hardware processor of the server device is further configured to retrieve the clothing image of a size matching or similar to the body shape parameter included in the received user information, and upon receipt of the second information from the second terminal, the hardware processor of the server device transmits the third information including the user information and the retrieved clothing image matching or similar to the body shape parameter included in the user information to the second terminal having transmitted the second information.

4. The system according to claim 1, wherein the hardware processor of the second terminal further accepts an instruction for rotation from the user, and the hardware processor of the second terminal is further configured to rotate the composite image displayed on the third display unit according to the instruction for rotation.

5. The system according to claim 1, wherein the hardware processor of the second terminal transmits, to the server device, the second information further including try-on subject identification information of a virtual try-on target, and upon receipt of the second information, the hardware processor of the server device transmits, to the second terminal having transmitted the second information, the third information including the user information on the try-on subject identified by the try-on subject identification information included in the received second information and the clothing image.

6. The system according to claim 1, wherein the hardware processor of the second terminal transmits, to the server device, the second information further including the try-on subject identification information of the try-on subject that operates the second terminal, the second storage unit of the server device further stores fourth information in which first try-on subject identification information of the try-on subject is associated with second try-on subject identification information of another try-on subject related to the try-on subject, and upon receipt of the second information, the hardware processor of the server device transmits, to the second terminal having transmitted the second information, the third information including the user information corresponding to the first try-on subject identification information that is the try-on subject identification information included in the second information, the user information corresponding to the second try-on subject identification information and the clothing image.

7. The system according to claim 1, wherein the hardware processor of the first terminal transmits, to the server device, the user information further including shooting date information of the try-on subject image, and the hardware processor of the server device is further configured to store, in the second storage unit, the received user information for the individual shooting date information included in the user information.

8. The system according to claim 1, wherein the hardware processor of the second terminal further accepts a request for purchase of the clothing in the clothing image, the hardware processor of the second terminal transmits, to the server device, purchase information including clothing identification information of the clothing in the clothing image and a signal of request for purchase, and the hardware processor of the server device further receives the purchase information from the second terminal.

9. The system according to claim 1, wherein the hardware processor of the first terminal is further configured to:

detect that the try-on subject is positioned in a predetermined area in a real space; and when the try-on subject is positioned in the area, display, on a first display unit, a composite image in which the try-on subject image of the try-on subject acquired by the first terminal is composited with the clothing image stored in advance.

10. The system according to claim 1, wherein the hardware processor of the first terminal acquires try-on subject images by shooting the try-on subject at a plurality of shooting angles, the hardware processor of the first terminal calculates the composite position information for each of the try-on subject images respectively corresponding to the plurality of shooting angles, the hardware processor of the first terminal transmits, to the server device, the user information including the try-on subject images respectively corresponding to the plurality of shooting angles, the second storage unit of the server device stores in advance the first information including the clothing images respectively corresponding to the plurality of shooting angles, and upon receipt of the second information, the hardware processor of the server device transmits, to the second terminal, the third information including the user information and the clothing images respectively corresponding to the plurality of shooting angles.

11. The system according to claim 10, wherein the shooting angles are angles when the try-on subject is rotated by 360° with the body of the try-on subject as a rotation axis.

12. The system according to claim 1, wherein the composite target area is included in the try-on subject image.

13. The system according to claim 1, wherein the composite target area surrounds the try-on subject area.

14. The system according to claim 1, wherein the hardware processor of the first terminal acquires the try-on subject image and a body shape parameter indicative of a body shape of the try-on subject in the try-on subject image, wherein to acquire the body shape parameter, the hardware processor is configured to calculate body shape parameters for the try-on subject from a depth map.

15. The system according to claim 14, wherein to calculate the body shape parameters the hardware processor is configured to extract a person area from the depth map;

acquire a try-on subject depth map based on the person area; and calculate the body shape parameters for the try-on subject based on the try-on subject depth map.

16. The system according to claim 15, wherein to acquire the try-on subject depth map the hardware processor is configured to set a threshold value for a distance in a depth direction at three-dimensional positions of a group of pixels constituting the depth map;

excluding, from the try-on subject depth map, first pixels of the group of pixels having respective positions coordinate in the depth direction determined to be equal to or larger than the threshold value; and including, in the try-on subject depth map, second pixels of the group of pixels having respective depths less than the threshold value.

\* \* \* \* \*